United States Patent
Papale et al.

(10) Patent No.: US 12,406,290 B2
(45) Date of Patent: Sep. 2, 2025

(54) NON-TRANSITORY COMPUTER-READABLE STORAGE MEDIA AND METHOD FOR AUTOMATICALLY CONFIGURING CUSTOM PRODUCT OPTIONS BASED ON USER ACTIONS

(71) Applicant: ZAZZLE INC., Menlo Park, CA (US)

(72) Inventors: Antonio Papale, Sausalito, CA (US); Lisa Nakano, Los Gatos, CA (US); Jason Li, Fremont, CA (US); Irena Pashchenko, Bellevue, WA (US); Matt Difonzo, Belmont, CA (US); Brent Hubbard Burgess, Winchester (GB); Christopher Collette, Los Altos, CA (US)

(73) Assignee: Zazzle Inc., Menlo Park, CA (US)

( * ) Notice: Subject to any disclaimer, the term of this patent is extended or adjusted under 35 U.S.C. 154(b) by 29 days.

(21) Appl. No.: 17/501,451

(22) Filed: Oct. 14, 2021

(65) Prior Publication Data
US 2022/0122144 A1    Apr. 21, 2022

Related U.S. Application Data

(60) Provisional application No. 63/092,382, filed on Oct. 15, 2020.

(51) Int. Cl.
*G06Q 30/00* (2023.01)
*G06Q 30/0601* (2023.01)
*H04L 67/50* (2022.01)

(52) U.S. Cl.
CPC ..... *G06Q 30/0621* (2013.01); *G06Q 30/0631* (2013.01); *G06Q 30/0643* (2013.01); *H04L 67/535* (2022.05)

(58) Field of Classification Search
CPC ........... G06Q 30/0621; G06Q 30/0641; G06Q 30/0643
(Continued)

(56) References Cited

U.S. PATENT DOCUMENTS

| | | |
|---|---|---|
| 5,999,189 A | 12/1999 | Kajiya et al. |
| 6,363,404 B1 | 3/2002 | Dalal et al. |

(Continued)

FOREIGN PATENT DOCUMENTS

| | | |
|---|---|---|
| JP | 2017-533524 A | 11/2017 |
| WO | 2020/152701 A1 | 7/2020 |

OTHER PUBLICATIONS

Qing-Jin, Peng, et al. "Personalization for Massive Product Innovation using Open Architecture." Chinese Journal of Mechanical Engineering = Ji xie gong cheng xue bao 31.1 (2018) ProQuest. Web. Jan. 14, 2023. (Year: 2018).*

(Continued)

*Primary Examiner* — Jeffrey A. Smith
*Assistant Examiner* — Kennedy Gibson-Wynn
(74) *Attorney, Agent, or Firm* — Patterson & Sheridan LLP.; Malgorzata A. Kulczycka

(57) ABSTRACT

In an embodiment, a method comprises: generating a user interface configured to allow selecting a product from a plurality of products that are customizable and displaying the user interface on a display device of a user computer; receiving, via the user interface, a selection of a particular product, from the plurality of products, that require customization; in response to receiving the selection of the particular product, automatically generating a plurality of customization options available for customizing the particular product; receiving one or more triggers of a plurality of triggers, generated based on customization options selected from the plurality of customization options; automatically generating (Continued)

one or more corresponding customization attribute values for the particular product; automatically generating one or more digital representations of the particular product, and displaying the digital representations of the particular product on the display device of the user computer.

16 Claims, 39 Drawing Sheets

(58) Field of Classification Search
USPC .................................. 705/26.5, 27.1, 27.2
See application file for complete search history.

(56) References Cited

U.S. PATENT DOCUMENTS

| | | | |
|---|---|---|---|
| 6,614,444 | B1 | 9/2003 | Duluk, Jr. et al. |
| 6,717,576 | B1 | 4/2004 | Duluk, Jr. et al. |
| 10,235,009 | B1* | 3/2019 | Jacobs, II ............... G06F 30/00 |
| 11,004,128 | B1* | 5/2021 | Mishra ............... G06Q 30/0621 |
| 11,257,297 | B1* | 2/2022 | Go ......................... G06Q 50/04 |
| 2002/0184110 | A1 | 12/2002 | Shimada |
| 2003/0179197 | A1 | 9/2003 | Sloan et al. |
| 2005/0081161 | A1 | 4/2005 | MacInnes et al. |
| 2005/0155316 | A1 | 7/2005 | Shipley |
| 2006/0122917 | A1* | 6/2006 | Lokuge ............... G06Q 30/0617 707/E17.107 |
| 2006/0226563 | A1 | 10/2006 | Albert et al. |
| 2007/0083383 | A1 | 4/2007 | Van Bael et al. |
| 2007/0165035 | A1 | 7/2007 | Duluk et al. |
| 2013/0173415 | A1 | 7/2013 | Harvill et al. |
| 2014/0096041 | A1 | 4/2014 | Gowen et al. |
| 2014/0279180 | A1 | 9/2014 | Beaver et al. |
| 2015/0002508 | A1 | 1/2015 | Tatarinov et al. |
| 2015/0006313 | A1* | 1/2015 | Beaver ............... G06Q 30/0643 705/26.5 |
| 2016/0063611 | A1 | 3/2016 | Davis et al. |
| 2017/0038767 | A1* | 2/2017 | Cluckers ............ G06Q 30/0621 |
| 2017/0357698 | A1* | 12/2017 | Chang ............... G06F 16/24575 |
| 2020/0122406 | A1 | 4/2020 | Bigos et al. |
| 2020/0294271 | A1 | 9/2020 | Ilola et al. |
| 2020/0327593 | A1* | 10/2020 | Schlecht ................. G06F 30/15 |
| 2022/0005099 | A1* | 1/2022 | Mordovskoi ........... G06F 30/10 |
| 2022/0035970 | A1 | 2/2022 | Cheshire et al. |
| 2022/0129964 | A1 | 4/2022 | Harvill |
| 2022/0318873 | A1* | 10/2022 | Han ................... G06Q 30/0621 |

OTHER PUBLICATIONS

Haskin, Roger L., and Raymond A. Lorie. "On extending the functions of a relational database system." Proceedings of the 1982 ACM SIGMOD international conference on Management of data. 1982. (Year: 1982).*

Wang, Charlie CL, Yu Wang, and Matthew MF Yuen. "Design automation for customized apparel products." Computer-aided design 37.7 (2005): 675-691. (Year: 2005).*

Kumar, Ashok. "From mass customization to mass personalization: a strategic transformation." International Journal of Flexible Manufacturing Systems 19 (2007): 533-547. (Year: 2007).*

Torres, Victor H., et al. "Approach to integrate product conceptual design information into a computer-aided design system." Concurrent Engineering 21.1 (2013): 27-38. (Year: 2013).*

Zhang, Jian, et al. "Open interface design for product personalization." CIRP Annals 66.1 (2017): 173-176. (Year: 2017).*

J. Wang, L. Cheng and W. Han, "The effect of default option on customer decision behavior in product customization," 2013 10th International Conference on Service Systems and Service Management, Hong Kong, China, 2013, pp. 85-89, doi: 10.1109/ICSSSM.2013.6602627. (Year: 2013).*

Non-Final Office Action dated Jan. 20, 2023 for U.S. Appl. No. 17/501,513.

Final Office Action dated Apr. 11, 2023 for U.S. Appl. No. 17/501,513.

Advisory Action dated Jul. 13, 2023 for U.S. Appl. No. 17/501,513.

Notice of Allowance dated Aug. 2, 2023 for U.S. Appl. No. 17/501,513.

Yuxiang Wang et al. "Decoupled Coverage Anti-Aliasing", Internet Citation, Aug. 21, 2015. URL: < https://www.ece.ucsb/psen/papers/wang15_DCAA.pdf.>.

International Search Report dated Feb. 18, 2025 for Application No. PCT/US2024/053453.

JP Office Action DTD May 28, 2025 For JP 2023-523232.

* cited by examiner

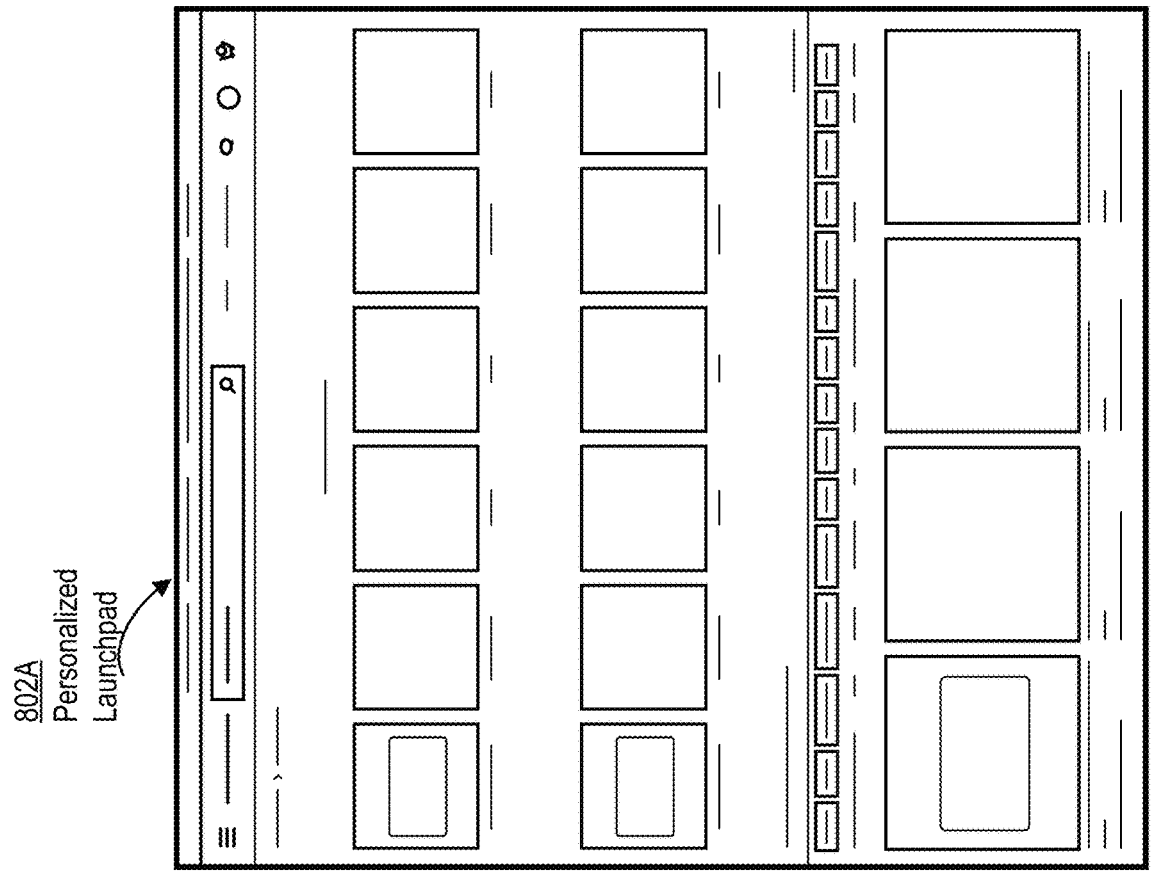
802A
Personalized Launchpad
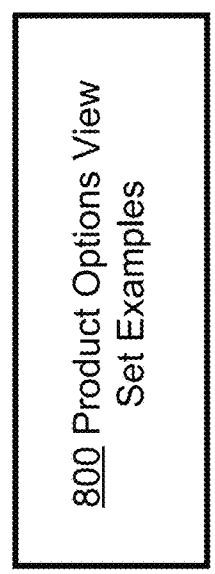
800 Product Options View Set Examples
Search Topic Filter
Dynamic content carousel based on a configurable set of rules
- Tag / Keyword (aka visual chips)
- Style
- Profession
- etc..
FIG. 8

1102A
Personalized
Launchpad

Onsite Search Template

∨ Basic

Department Select
Tapestries

Title
Tapestries

Search Terms (comma separated) ○
tapestry, tapestries

☐ Match any non-department searches containing all search terms ○

Cancel
Save

FIG. 11

1800 Playbook

- Built on top of the CMS
- Precise intent matching
- 13 Template Types
- Wildcard support
- Advanced Scheduling 1900 Product Options View Set Examples Search Powered
Marketplace Search, Department, Product Search Content Powered
Portals, Full-width, Text Beside Content, Image, Video SEO
Breadcrumb, H1, ZReach, BloomReach, Note Meta Description PDP
Product Customizer, Found in Collection, Reviews, Related Products

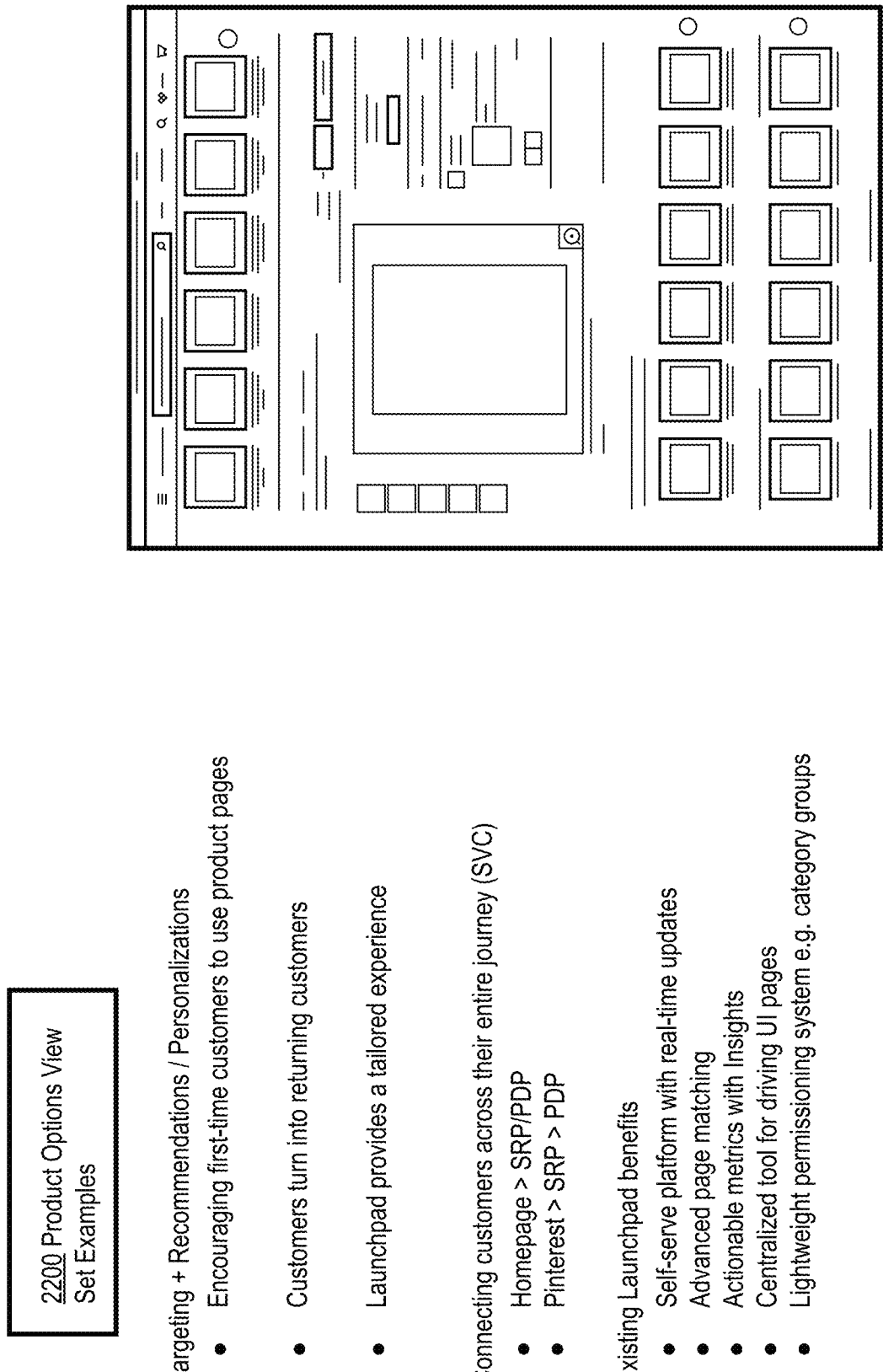

2200 Product Options View
Set Examples

Targeting + Recommendations / Personalizations
- Encouraging first-time customers to use product pages
- Customers turn into returning customers
- Launchpad provides a tailored experience Connecting customers across their entire journey (SVC)
- Homepage > SRP/PDP
- Pinterest > SRP > PDP Existing Launchpad benefits
- Self-serve platform with real-time updates
- Advanced page matching
- Actionable metrics with Insights
- Centralized tool for driving UI pages
- Lightweight permissioning system e.g. category groups

FIG. 22

2300 Product Options View Set Examples

Product Search
Dynamic product carousel based on a configurable rulesets

- Verified Templates
- Editor's Picks
- Popular under $25, etc.

2400A Product Options
View Set Examples

Search Facet Filter
Dynamic search filters based on a configurable set of rules

- Brand
- Price
- Style
- Model
- etc..

2400B Product Options
View Set Examples

Examples
- Most Popular
- Trending
- New Arrivals
- Viewed Together
- Bought Together
- Recommended for You
- Personalized
- Similar Targeting Criteria Filtering AB Testing 2400C Product Options
View Set Examples Search Facet Filter
Dynamic search filters, based on a configurable set of rules
- Brand
- Price
- Style
- Model
- etc..

Additional filters
- Recommended Filters
- Personalized Filters
- Dynamic Filters 2400D Product Options View Set Examples

2500B Example GUI

PIDs to Pin in Search

Design Owner

Image

Specify image path

Upload Asset

Or Image GUID

Browse

Dynamic Realview Id

Upload Asset

Clear Asset

Size

Sample Type

Crop

Position

NON-TRANSITORY COMPUTER-READABLE STORAGE MEDIA AND METHOD FOR AUTOMATICALLY CONFIGURING CUSTOM PRODUCT OPTIONS BASED ON USER ACTIONS

BENEFIT CLAIM

This application claims the benefit under 35 U.S.C. § 119(e) of provisional application 63/092,382, filed Oct. 15, 2020, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

CROSS REFERENCE TO RELATED APPLICATIONS

This application is related to U.S. patent application Ser. No. 17/193,512, filed Mar. 5, 2021; U.S. application Ser. No. 17/038,659, filed Sep. 30, 2020; U.S. Pat. No. 8,090,461, granted Jan. 3, 2012; U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US published patent application no. 2013/0060654, filed Aug. 29, 2012; the entire contents of each of which are hereby incorporated by reference for all purposes as if fully set forth herein.

FIELD OF THE DISCLOSURE

One technical field of the disclosure is an approach for automatically configuring custom product options based on user actions monitored and tracked by collaborative computer platforms. Another technical field is tracking the user actions to generate options for customizing products available from the collaborative computer platforms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In many cases, web-based sites that allow browsing, selecting, and ordering products implement relational database management systems (RDBMS). The RDBMS may be used to store and maintain information about the products. When an end user queries the site for information about a particular product, the site may access product information from the product records stored in the RDBMS and return the stored information to the end user.

Computer systems that are configured to facilitate ordering custom manufactured products face, however, several challenges. One of the challenges includes the difficulties with handling data definitions of the products. The data definitions usually capture attributes of the products. Each product may have, for example, numerous attributes, and the attributes may be combined with or used with a plurality of other products. For example, users may have thousands of choices of individual products and many products may be compatible with or act as accessories to other products.

Capturing the attributes may be particularly difficult in the case of custom manufactured framed products or mounted products, such as pictures, where a user can select or upload an arbitrary image, choose a frame or mounting, glazing or other protection, and then order the assembled product. A particular customer-defined product may be entirely unique and different from all previously ordered products, yet the computer system is usually expected to determine whether manufacturing of the product is possible or practical.

In this context, relational database structures and other methods of describing products and their attributes have been proven inadequate and inflexible. Typical RDBMS implementations have required extensive programming of stored procedures or other custom code to resolve compatibility and match accessories to products. Further, the number of stored records required in a custom manufacturing context is often impractical. For example, the permutations for a product such as a framed print are potentially in the trillions when attributes are constrained, and infinite when attributes are continuously variable within broad ranges. Therefore, generating fixed records for every conceivable product permutation would result in a significant waste of the storage.

BRIEF DESCRIPTION OF DRAWINGS

FIG. 8 illustrates examples of product options view set examples, according to some embodiments;

FIG. 11 illustrates an example of an online search, according to some embodiments;

FIG. 22 illustrates an example of a product page, according to some embodiments;

FIG. 25B illustrates an example of a dynamic RealView, according to some embodiments;

FIG. 25C illustrates an example of a replacement product ID process, according to some embodiments;

DESCRIPTION OF EXAMPLE EMBODIMENTS

Figure 1:
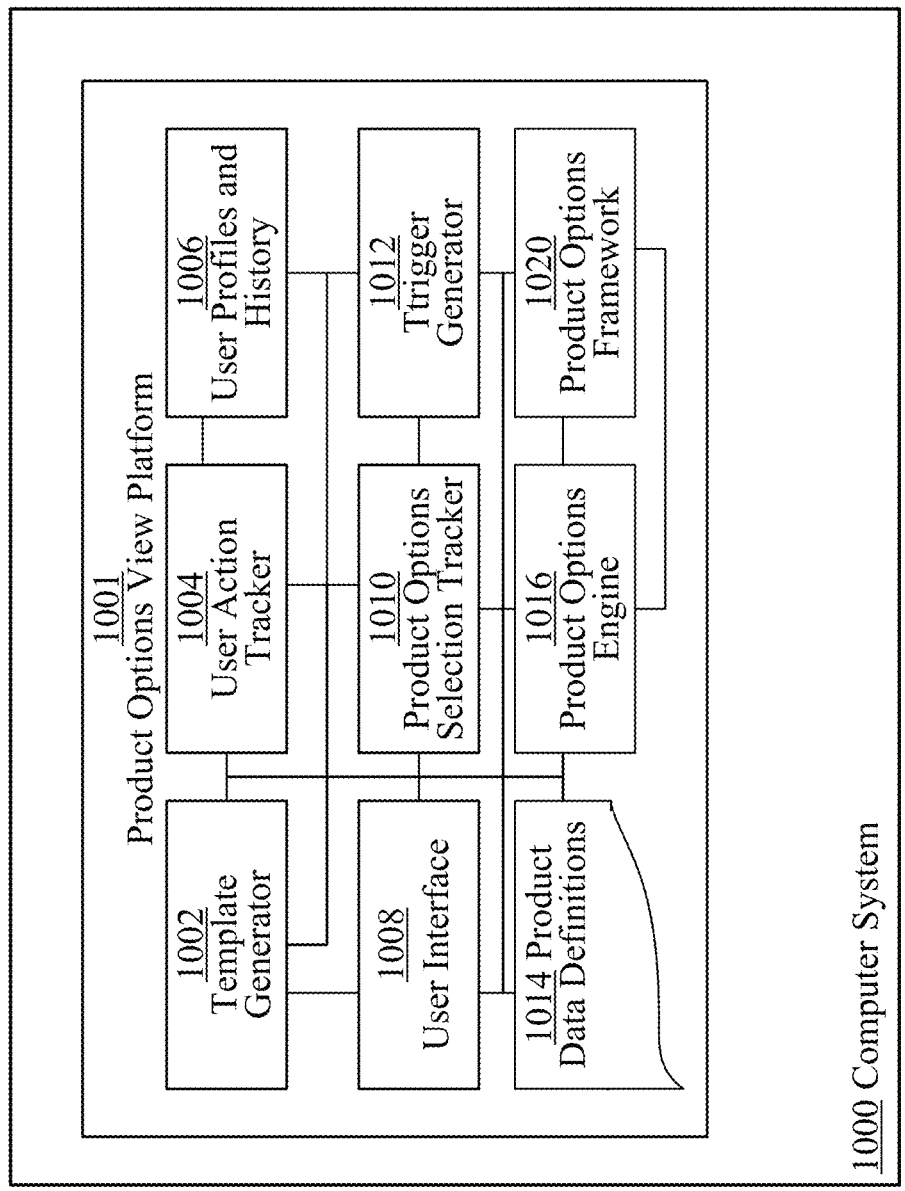
FIG. 1 illustrates an example system for implementing a method for automatically configuring custom product options based on user actions, according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Product Options View Platform
   3.1 Examples
   3.2 Product Options View Templates
   3.3 Accumulating product data based on user interactions with the Web and mobile applications
   3.4 Modifying and annotating the product data
   3.5 Rendering digital views of the product
4.0 Product Options View User Logs
5.0 Product Options View Set Triggers
   5.1 Constructing a set of software triggers based on the accumulated data
      5.1.1 Triggers based on product options view sets
      5.1.2 Triggers based on product options view user logs
         5.1.2.1 Triggers based on a user presence on the site
         5.1.2.2 Triggers based on purchases using the site
         5.1.2.3 Triggers based on lack of interactions with the site
6.0 Visual Product Options View Set Logic Editor
7.0 Product View Renderer
   7.1 A RealView
   7.2 A DesignView
8.0. Flexible Framework for Defining and Customizing Products and Accessories
   8.1 Attributes Engine: Key-Value Descriptions and Options Strings
   8.2 Product Options Framework
   8.3 Accessories Framework
   8.4 Bundling Framework for Grouped Products
   8.5 Default Framework
   8.6 Rendering Framework
   8.7 Additional Frameworks
9.0 Implementation Mechanisms—Hardware Overview
10.0 Extensions and Alternatives 1.0 General Overview In some embodiments, techniques are described for automatically configuring custom product options for a customized product based on user interactions with a computer-based product customization marketplace. According to the presented approach, a user interface is generated and displayed for a user to assist the user in determining a product that the user would like to customize, and subsequently, to automatically generate the customization options for the product for the user. The user interface may be implemented, for example, as a graphical user interface, that is configured to provide robust and multi-facet search capabilities and to provide templates for the product customization options. As the user interacts with the user interface, the paths taken by the user as he navigates through various pages of the interface are being followed and the user's choices are being automatically recorded.

The automatically recorded paths and choices made by the user are used to generate, so called, triggers. The triggers capture the specific choices made by the user as he interacts with the user interface and capture the specific customization attributes of the product that the user is interested in. For example, if the user used the search options of the user interface to find out about Thanksgiving gifts and navigated to the offerings of mugs having Thanksgiving-related printing on them, then the system may generate a trigger indicating that the user is interested in customizing a mug, a trigger indicating that the user is interested in Thanksgiving-theme mugs, a trigger indicating that the user is interested in mugs having Thanksgiving-related printings, and so forth. These examples are provided herein to illustrate simple examples; practical implementations may include more complex triggers and the triggers may be generated using more complex approaches.

Additional triggers may be generated based on information collected about the user. That information may include the user's profile, the user's preferences, the user's purchase history, the user's search history, the user's location, and so forth. For example, if the user is interested in customizing a mug, and the user's profile indicates that the user might be a teenager, then a trigger may be generated to indicate that teenager-appropriate customization options should be presented to the user.

The triggers may be modified, enhanced, and otherwise improved.

In some embodiments, based on the triggers, one or more customization attributes and one or more corresponding customization attribute values are automatically generated. For example, based on the triggers described above, a system may automatically generate a plurality of customization options for a mug to indicate that the mug is a Thanksgiving-related mug having a Thanksgiving-related printing on it, and that the printing is teenager-appropriate.

The automatically generated customization attributes and the customization attribute values are used to automatically generate digital representations of the customized product, and to display the digital representation on a display device for the user.

2.0 Structural and Functional Overview

According to techniques described herein, a system may be configured to automatically configure custom product options for a customized product based on user actions. The attribute values for the customization options for the customized product are automatically determined based on triggers generated as the user explores predefined templates and template configurations. Based on the attribute values of the customization options for the customized product, a digital visualization of the customized product is generated and displayed on a display device for the user. Product customization options may be based on product data definitions, which may be defined using key-value pairs. Customization options are sets of key-value pairs that modify a Product Description in the Product Options Framework (described later), and cause an update of the Product Options View, and how the Product Description causes a product to be manufactured.

In some embodiments, the approach may be implemented using a user interface that is driven by powerful search engines, product options engines and the like. As the user interacts with the user interface and, for example, explores various popular offerings of products, seasonal offerings of products, and other offerings, the items and combinations that the user's selections are recorded. The recorded information is enhanced by the information about the user's history, the user's profile, the user's purchasing habits, and the user' preferences to automatically form a body of knowledge about the user and the products that the user is interested in.

In some embodiments, the body of knowledge about the user and the products that the user is interested in is used to automatically generate, so called, triggers. A trigger is a piece of information that provides an indication of a product that the user is interested in, or about the product's attribute value. For example, if the user has been exploring the seasonal offering related to the Christmas Holiday and browsed the web pages showing various Christmas cards depicting elaborate and colorful cards, then the automatically generated body of knowledge may be used to generate a trigger indicating that the user is interested in purchasing Christmas cards, a trigger indicating that the user is interested in purchasing an elaborate and colorful Christmas card, and the like.

Additional triggers may include the triggers that can be generated based on the user's history, the user's profile, the user's purchasing habits, and so forth. For example, if in the past, the user used to purchase gifts in the price range between $20 and $40, then an additional trigger may be automatically generated to indicate the particular price range. Other triggers may also be generated.

In some embodiments, a trigger may be implemented as digital code that is called when a user views a graphical user interface to find a custom product. The trigger, as defined above, may be tied to previous user actions. For instance, a user may have searched for, and visited a product category for printed invitations. Additionally, another trigger, based on a user's search keyword may indicate that the user searched for custom products for an event, such as a wedding. Additionally, another trigger may indicate the User's name. In many cases a plurality of triggers may be present when a user views a graphical user interface to find a custom product.

In some embodiments, this plurality of triggers may be transformed into specific product options for a custom product using a series of logical operations. The logic operations may have two inputs, one being a trigger, another being a value to compare to the trigger. For instance, a trigger that indicates that a product category was visited, may be compared to the category name 'Invitations.' This logic operation may return a product type on evaluating its input. Another logic operation may match a search term for 'Wedding,' another logic operation may recover the User's name from a trigger, and produce a similar name, or the user's initials. Logic operations may be combined so that if the Invitations product is selected, product option templates for Weddings are used to populate the Invitation Product Options, and a monogram field in the Invitation Product Options is set to the user's initials.

A specific Product Options View Set may be defined by:
  a. The application-wide triggers selected for evaluation.
  b. The logical operations which use triggers to select a product.
  c. Logical operations which use triggers to select a product option template for the product.
  d. Logical operations which use triggers to set specific product options.
  e. The means to render the product, and its product options to a graphical use interface.

In this way, the triggers may be used to select specific attributes and the corresponding attribute values for a customized product that then may be used to digitally generate a customized product which may be displayed in the user interface for the user to view. Continuing with the above example, based on the above described triggers, the system may automatically select the specific attributes and the specific attribute values for the customized Christmas cards that the user might be interested in viewing and potentially purchasing.

In some embodiments, a specialized editor is used to assemble triggers, Logical operations, and their related product option templates and options. This editor may visually show the Product Options View Set produced as a result of the selected triggers, and logic.

Once the specific attributes and the specific attribute values are automatically selected, the system may automatically invoke a product option framework, and then a rendering framework to generate a digital depiction of the customized product. The product option framework and the rendering framework are described later.

3.0 Product Options View Platform

FIG. 1 illustrates an example system for implementing a method for automatically configuring custom product options based on user actions, according to some embodiments. Depicted example is provided for illustrative purposes. It should be noted that other implementations may include different configurations of the components than those shown in FIG. 1.

FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the depicted example, a product options view platform 1001 comprises a template generator 1002, a user action tracker 1004, a user profiles and history database 1006, a user interface 1008, a product options selection tracker 1010, a trigger generator 1012, a product data definitions 1014, a product options engine 1016, and a product options framework 1020. Other implementations may include additional components not depicted in FIG. 1. Yet other implementations may include fewer components than those depicted in FIG. 1.

Template generator 1002 may be configured to provide the functionalities for generating, modifying, and integrating templates used by product options view platform 1001. The templates are described later.

User action tracker 1004 may be configured to provide the functionalities for tracking the action undertaken by users who interact with product options view platform 1001. For example, user action tracker 1004 may track how a user navigates through the pages displayed for the user by the applications executing on product options view platform 1001 and what choices the user makes as the user navigates through the pages.

User profiles and history database 1006 may be configured to store data representing user profiles of the user who interact with product options view platform 1001 and information about the user who, for example, purchased any items, ordered any items, considered buying any items, etc., using the utilities offered by product options view platform 1001.

User interface 1008 may be configured to generate and display a user interface that allows users to interact with product options view platform 1001. This may include generating pages by the applications executing on product options view platform 1001. Examples of various interfaces are described later.

Product options selection tracker 1010 may be configured to provide the functionalities for tracking the options selected by users as the users navigate via the user interface driven by the application executing on product options view platform 1001. Different ways of tracking the users' selections are described later.

Trigger generator 1012 may be configured to provide the functionalities for collecting data that may be used to determine various triggers, and for generating triggers based on the collected data. Examples of various triggers are described later.

Product data definitions 1014 may be configured to store and provide definitions of products available to the user, various Product options engine 1016 may be configured to provide the functionalities for managing various options and option configuration for the product offered by the website. Product options engine 1016 is described in detail later.

Product options framework 1020 may be configured to provide the framework for handling the product options. Product options framework 1020 is described in detail later.

3.1 Examples

FIG. 2-9 depict various examples of processing flows for implementing a method for automatically configuring custom product options based on user actions.

Figure 2:
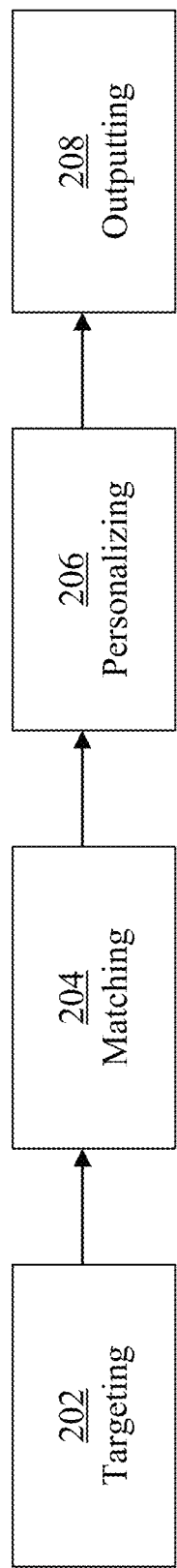
FIG. 2 illustrates an example processing flow for implementing a method for automatically configuring custom product options based on user actions, according to some embodiments.

FIG. 2 illustrates an example processing flow for implementing a method for automatically configuring custom product options based on user actions, according to some embodiments. The functionality components depicted in FIG. 2, and described in detail later, include targeting 202, matching 204, personalizing 206, and outputting 208. Other functionalities may also be included in the process.

Figure 3:
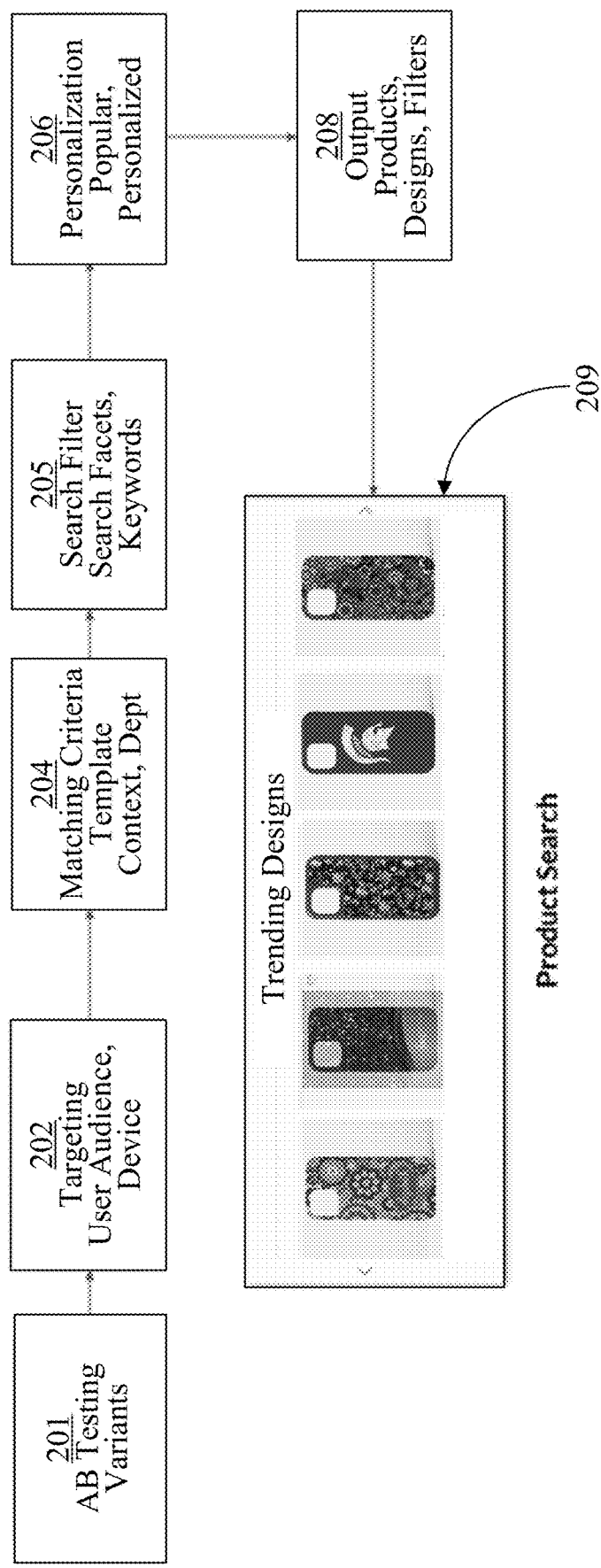
FIG. 3 illustrates an example processing flow for implementing a method for automatically configuring custom product options based on user actions, according to some embodiments.

FIG. 3 illustrates an example processing flow for implementing a method for automatically configuring custom product options based on user actions, according to some embodiments. The functionality components depicted in FIG. 3, and described in detail later, include AB testing 201, targeting 202, a matching 204, a search filtering 205, a personalization 206, and an outputting 208. Examples of different designs are shown with 209. Other functionalities may also be included in the process.

Figure 4:
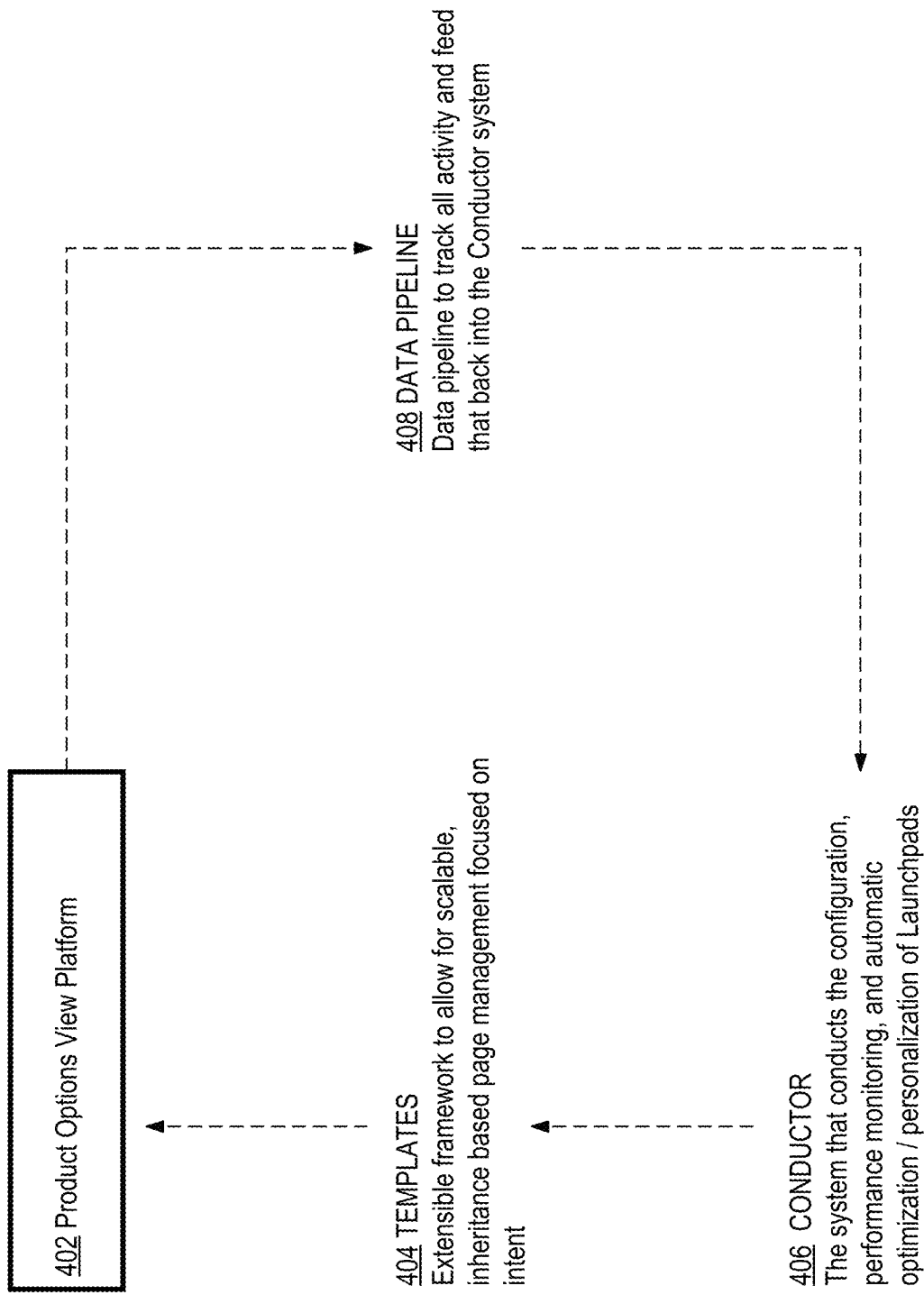
FIG. 4 illustrates examples of personalized interactive product options view platform, according to some embodiments.

FIG. 4 illustrates examples of personalized interactive product options view platform, according to some embodiments. As it will be described in detail later, a product option view platform 402 may utilize templates 404, managed and monitored by a conductor 406. The platform may manage a data pipeline 408. The details are provided later.

Figure 5:
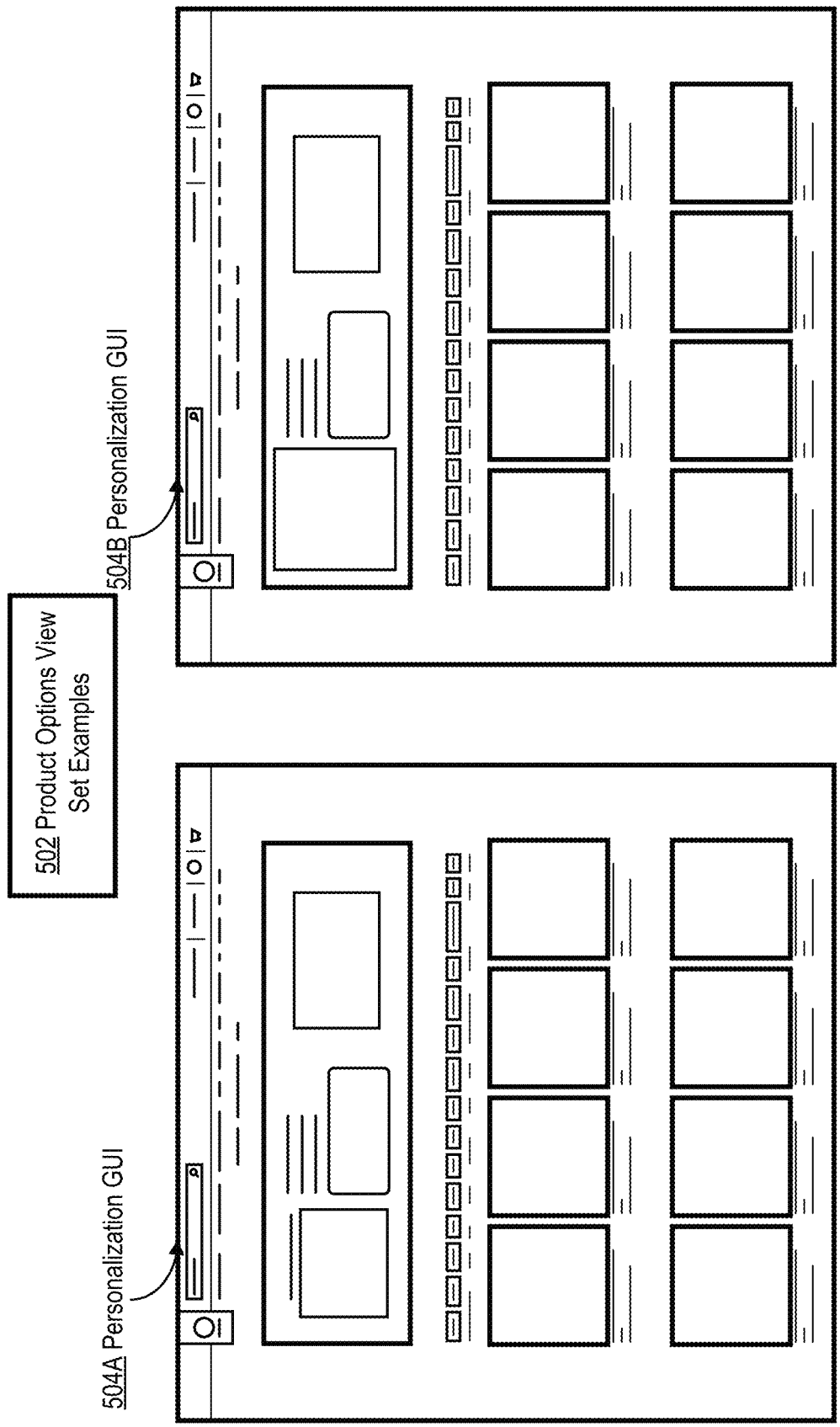
FIG. 5 illustrates examples of personalized interactive product options view set examples, according to some embodiments.

FIG. 5 illustrates examples of personalized interactive product options view set examples, according to some embodiments. As it will be described in detail later, product options view set examples 502 may include various GUI, including a personalization GUI 504A, a personalization GUI. 504B, and the like.

Figure 6:
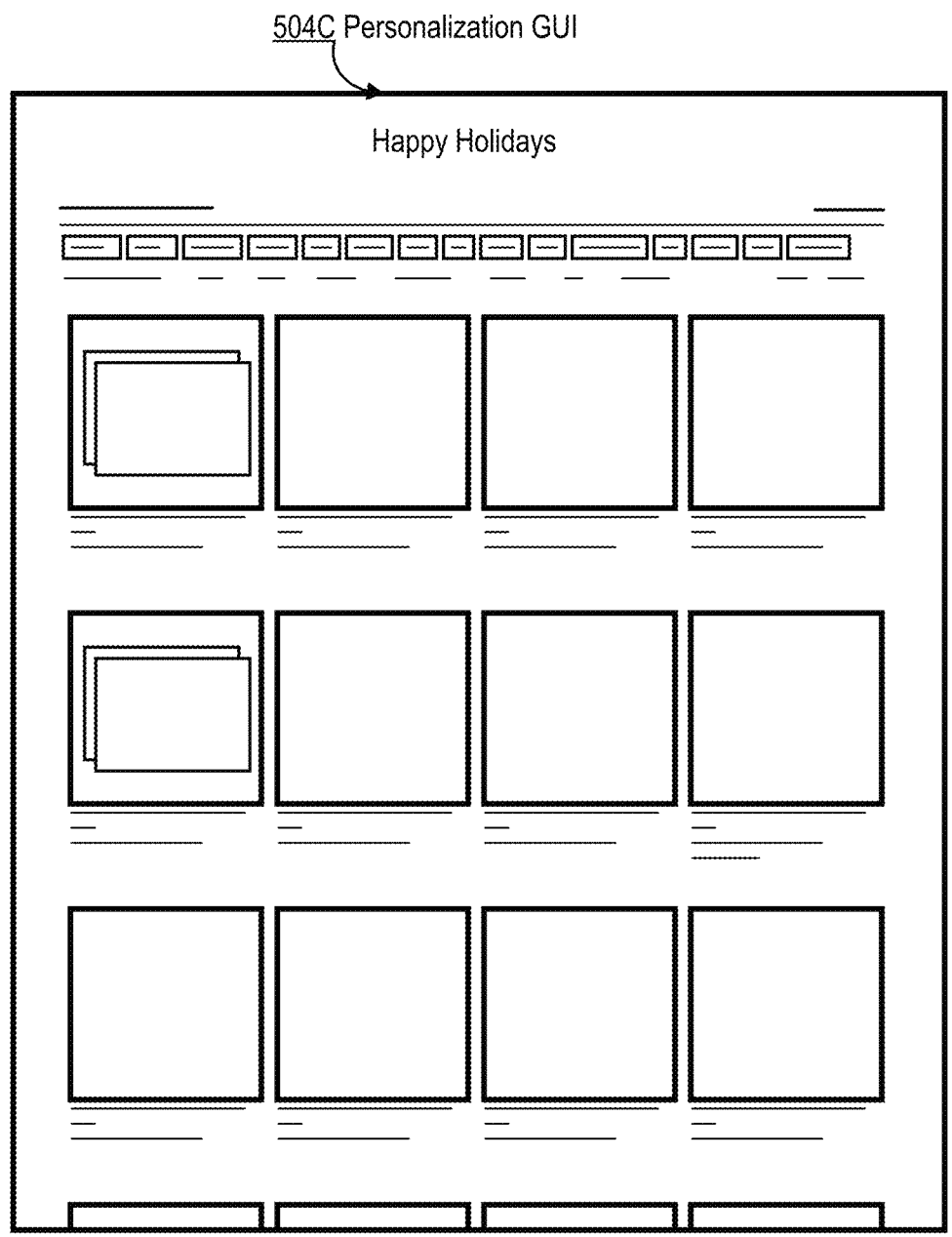
FIG. 6 illustrates examples of templates, according to some embodiments.

FIG. 6 illustrates examples of templates, according to some embodiments. As shown in FIG. 6, an example template may include a happy holiday template, shown in a personalization GUI 504C.

Figure 7:
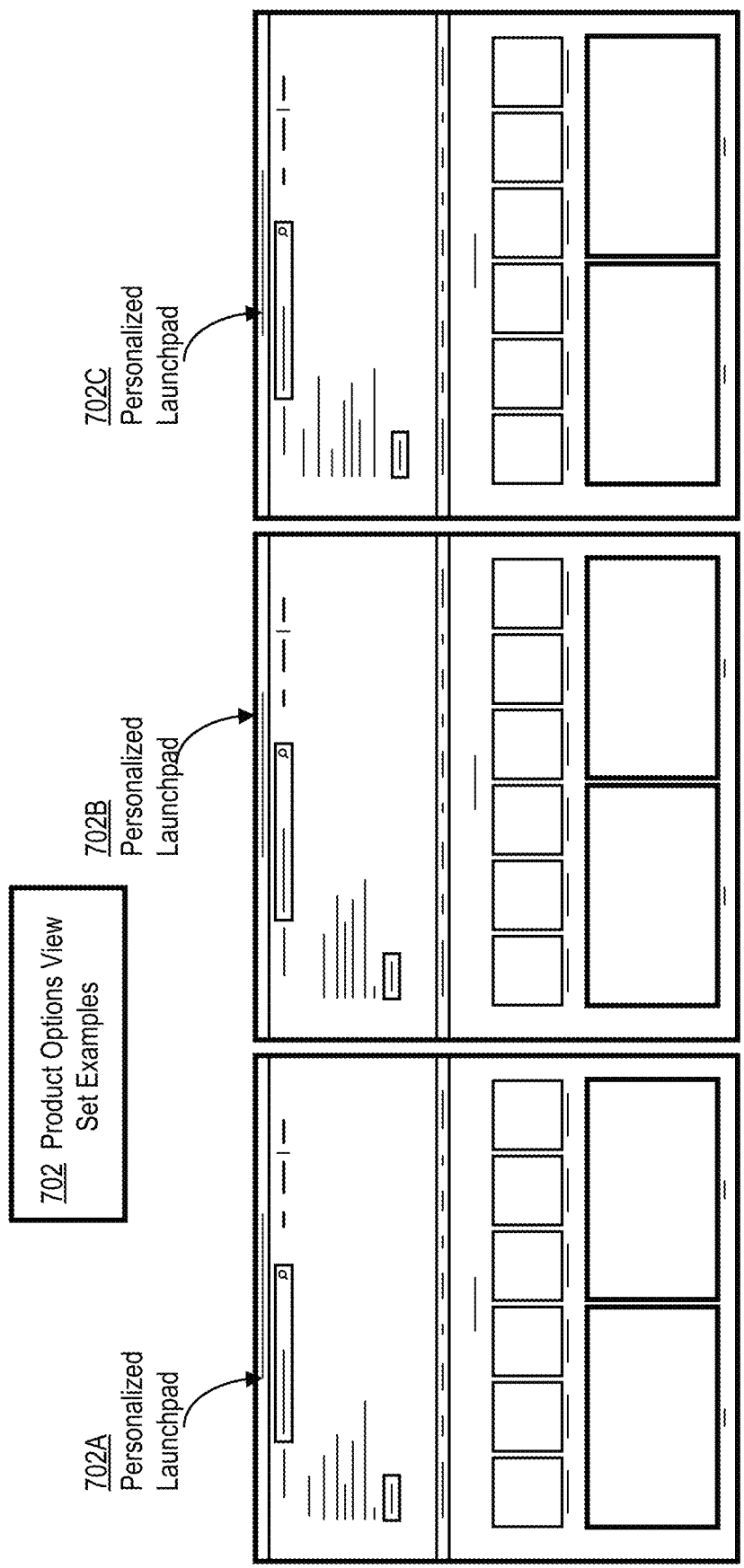
FIG. 7 illustrates examples of personalized product options view sets, according to some embodiments.

FIG. 7 illustrates examples of personalized product options view sets, according to some embodiments. As it will be described later, product options view set examples 702 may include various personalized launchpads. The launchpads may be implemented as various GUIs. Examples shown in FIG. 7 include a personalized launchpad 702A, a personalized launchpad 702B, a personalized launchpad 702C, and the like.

FIG. 8 illustrates examples of product options view set examples, according to some embodiments. As it will be described later, product options view set examples 802 may include various personalized launchpads. The launchpads may be implemented as various GUIs. Examples shown in FIG. 8 include a personalized launchpad 802A, and the like.

Figure 9:
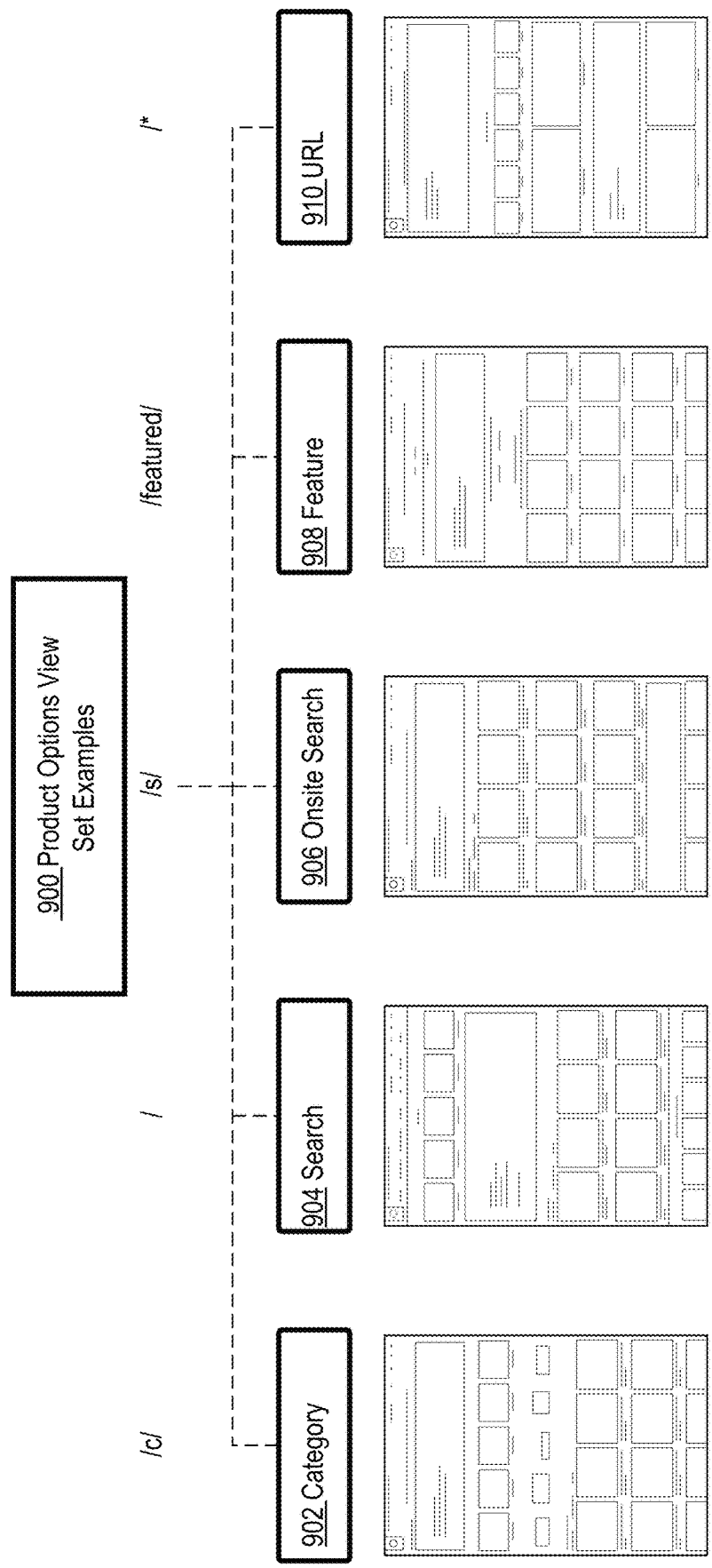
FIG. 9 illustrates examples of product options view set examples, according to some embodiments.

FIG. 9 illustrates examples of product options view set examples, according to some embodiments. As it will be described later, product options view set examples 902 may include various personalized functionality sets. The examples shown in FIG. 9 include category search functionalities 902, search functionalities 904, onsite search functionalities 906, feature selection functionalities 908, URL access functionalities 910, and the like.

3.2 Product Options View Templates

FIG. 10-18 depict various examples of templates and examples of the processes that generate and display the templates in graphical user interface.

Figure 10:
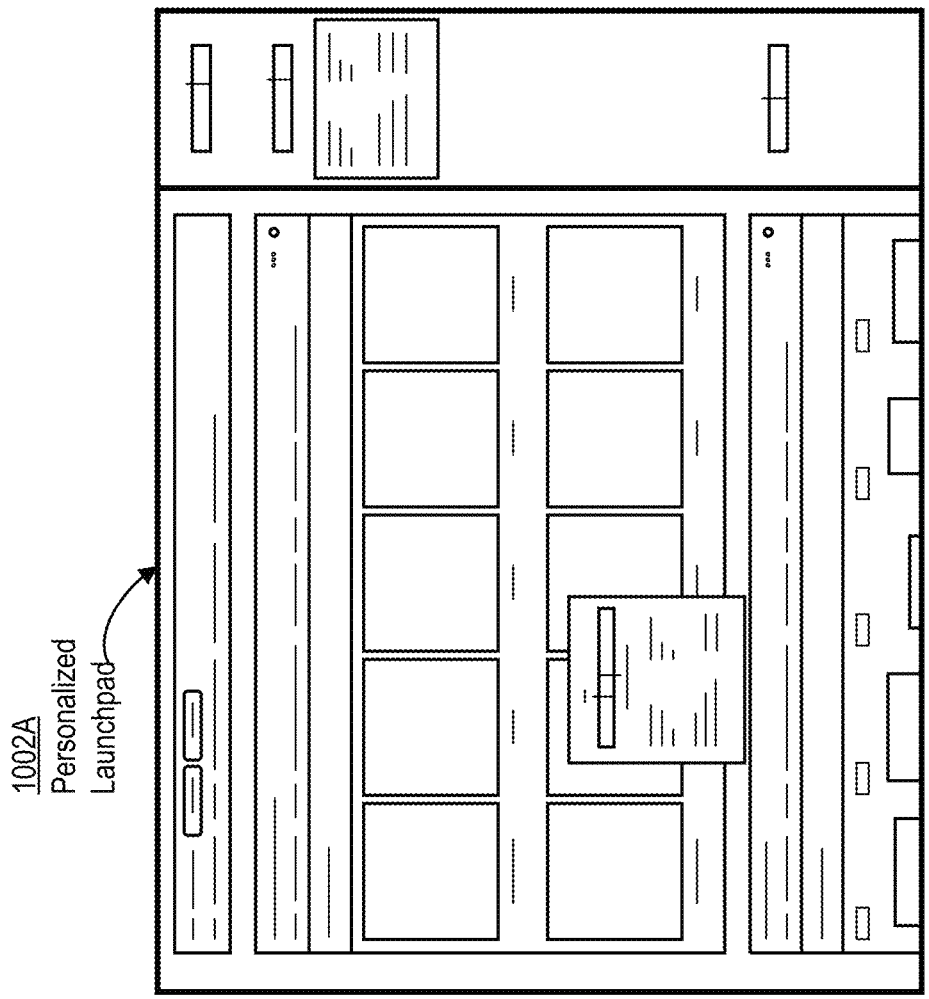
FIG. 10 illustrates examples of templates, according to some embodiments.

FIG. 10 illustrates examples of templates, according to some embodiments. In the depicted example, templates 1002B may be accessible from a personalized launchpad 1002A. The details are described later.

FIG. 11 illustrates an example of an online search, according to some embodiments. In the depicted example, a personalized launchpad 1102A provides an onsite search template and the corresponding functionalities. The details are described later.

Figure 12:
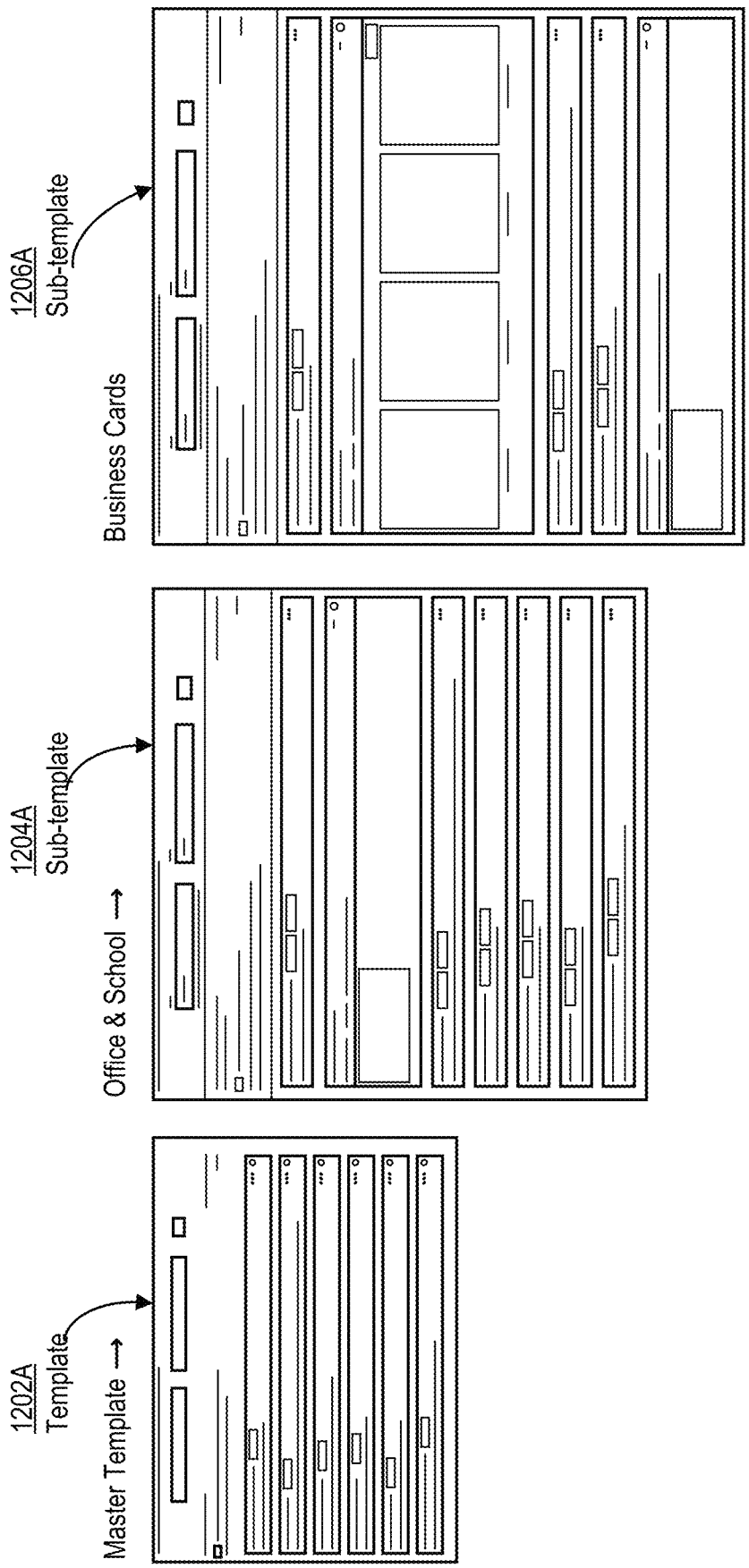
FIG. 12 illustrates examples of templates and sub-templates, according to some embodiments.

FIG. 12 illustrates examples of templates and sub-templates, according to some embodiments. In the depicted example, master template 1202A, may be implemented in such a way that a selection of an item in master template 1202A causes the platform to display one or more other templates, including a sub-template 1204A and/or sub-template 1206A.

Figure 13:
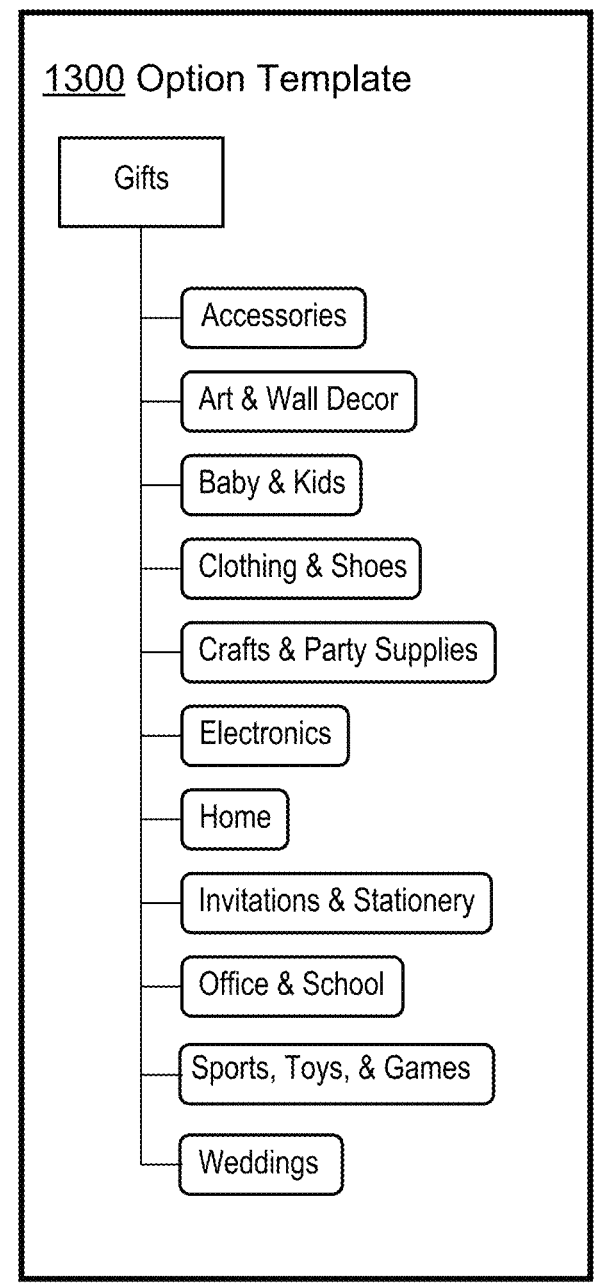
FIG. 13 illustrates examples of templates, according to some embodiments.

FIG. 13 illustrates examples of templates, according to some embodiments. In the depicted example, an option template 1300 includes a variety of options that are available to a user of an option platform. Option template 1300 may include, for example, gifts such as accessories, art and wall decor, baby and kids' gifts, clothing gifts, shoes, craft and party supplies, electronics, home, invitations and stationery, office and school supplies, sports, toys and games, wedding supplies and the like. The depicted examples are provided only for illustration purposes. Other implementations may include other gifts options and products.

Figure 14:
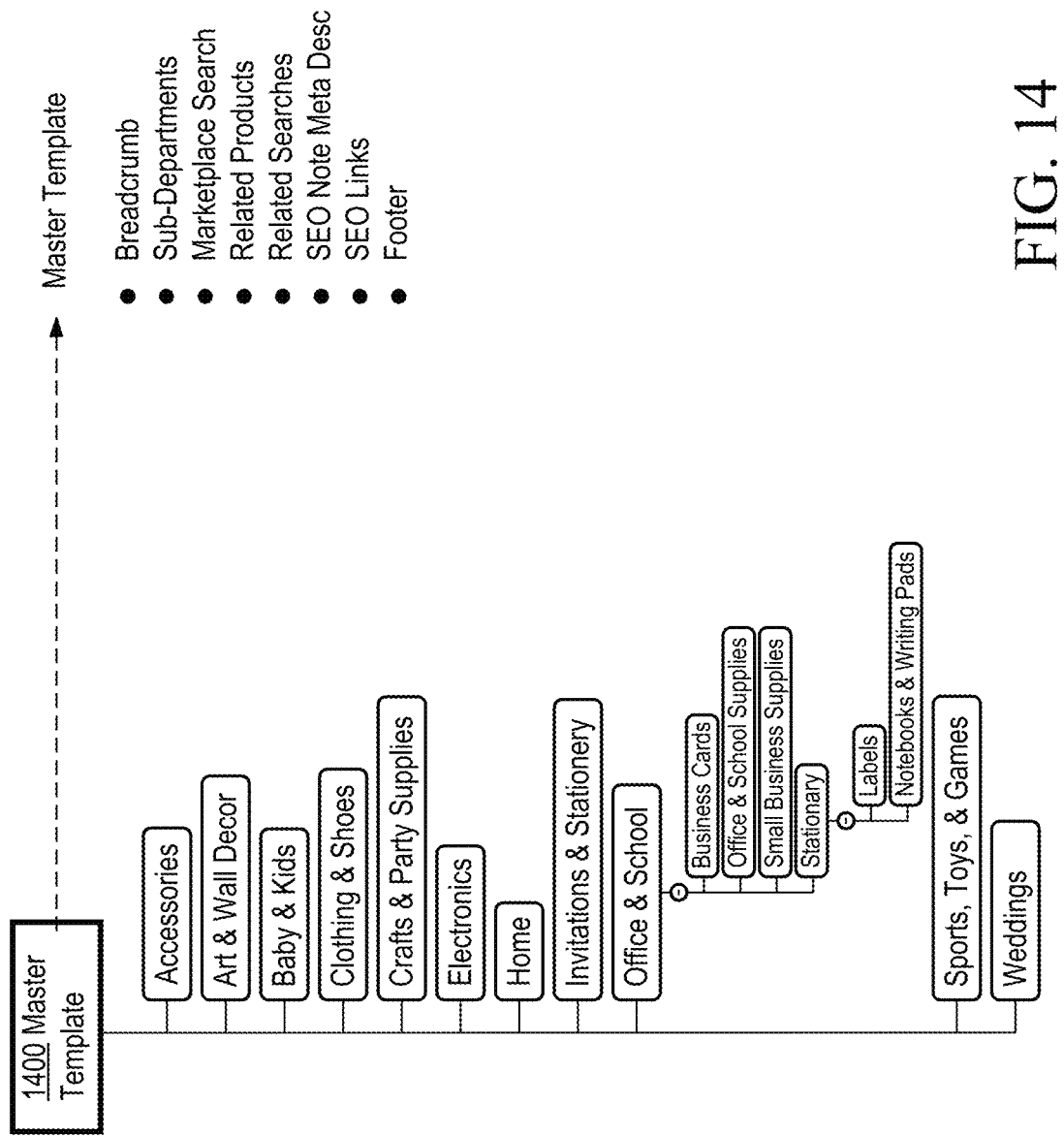
FIG. 14 illustrates examples of templates, according to some embodiments.

FIG. 14 illustrates examples of templates, according to some embodiments. In the depicted example, an option template 1400 includes a variety of options that are available to a user of an option platform and that include sub-templates and sub-sub-templates. Option template 1400 may include, for example, gifts such as accessories, art and wall decor, baby and kids' gifts, clothing gifts, shoes, craft and party supplies, electronics, home, invitations and stationery, office and school supplies, sports, toys and games, wedding supplies and the like. In the depicted example, the office and school supplies may include several sub-templates, including a business card template, an office and school supplies template, a small business supplies template, a stationary template, and the like. Furthermore, the stationary template may include a labels sub-sub template, a notebooks and writing pads template, and the like. The depicted examples are provided only for illustration purposes. Other implementations may include other gifts options and products.

Figure 15:
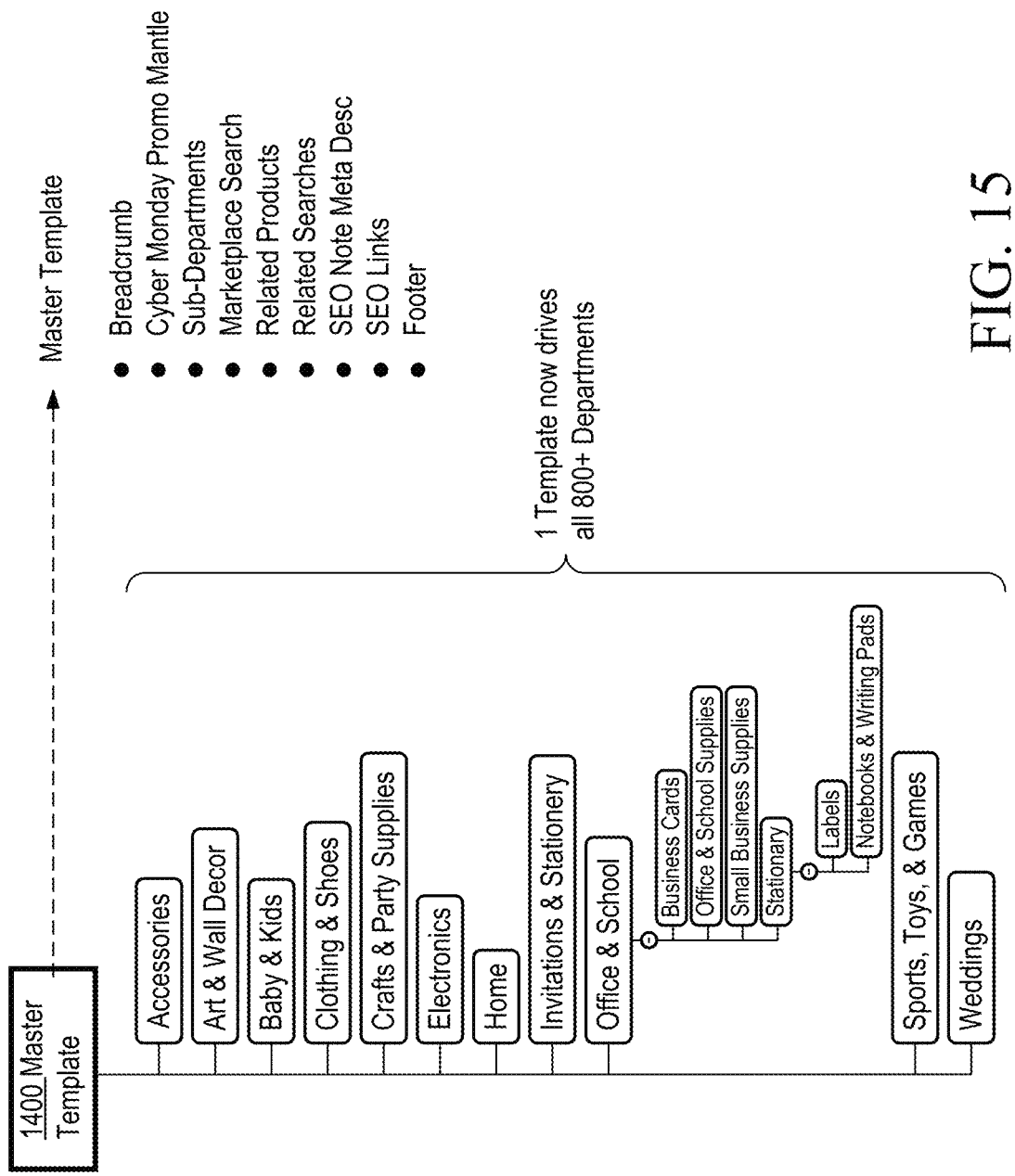
FIG. 15 illustrates examples of templates, according to some embodiments.

FIG. 15 illustrates examples of templates, according to some embodiments. In comparison with FIG. 14, FIG. 15 is meant to illustrate that one template is capable of driving many sub-templates and many sub-sub templates, that individually correspond to separate departments handling various types of gifts and that collectively handle a multi-departmental customization enterprise. In the depicted example, an option template 1400 includes a variety of options that are available to a user of an option platform and that include sub-templates and sub-sub-templates. Option template 1400 may include options similar to those in FIG. 14. The depicted examples are provided only for illustration purposes. Other implementations may include other gifts options and products.

Figure 16:
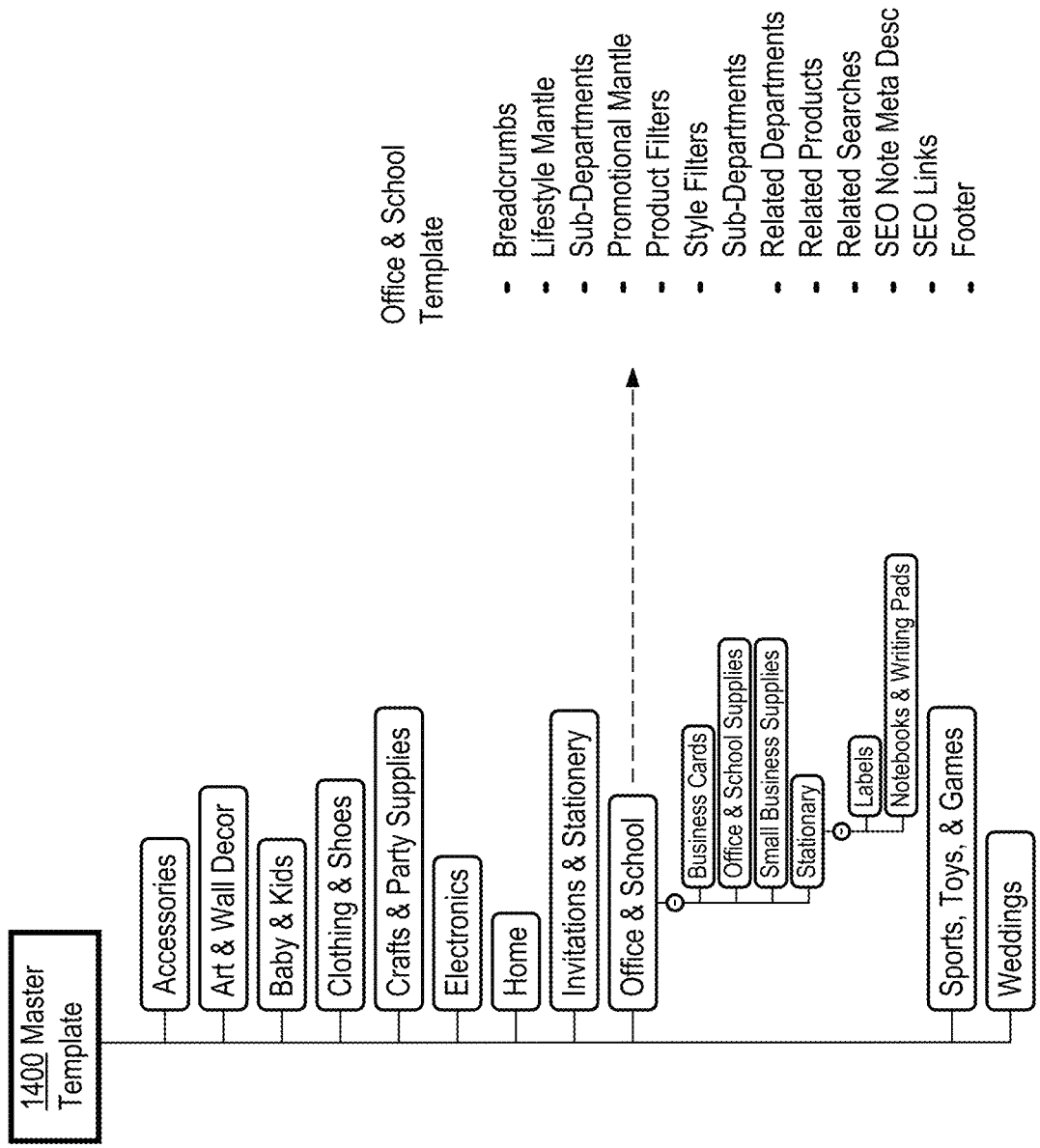
FIG. 16 illustrates examples of templates, according to some embodiments.

FIG. 16 illustrates examples of templates, according to some embodiments. FIG. 16 illustrates examples of templates, according to some embodiments. In comparison with FIG. 14, FIG. 16 is meant to illustrate that one template is capable of driving many sub-templates and many sub-sub templates, that individually correspond to separate departments handling various types of gifts and that collectively handle a multi-departmental customization enterprise. In the depicted example, an option template 1400 includes a variety of options that are available to a user of an option platform and that include sub-templates and sub-sub-templates. Option template 1400 may include options similar to those in FIG. 14. The depicted examples are provided only for illustration purposes. Other implementations may include other gifts options and products.

Figure 17:
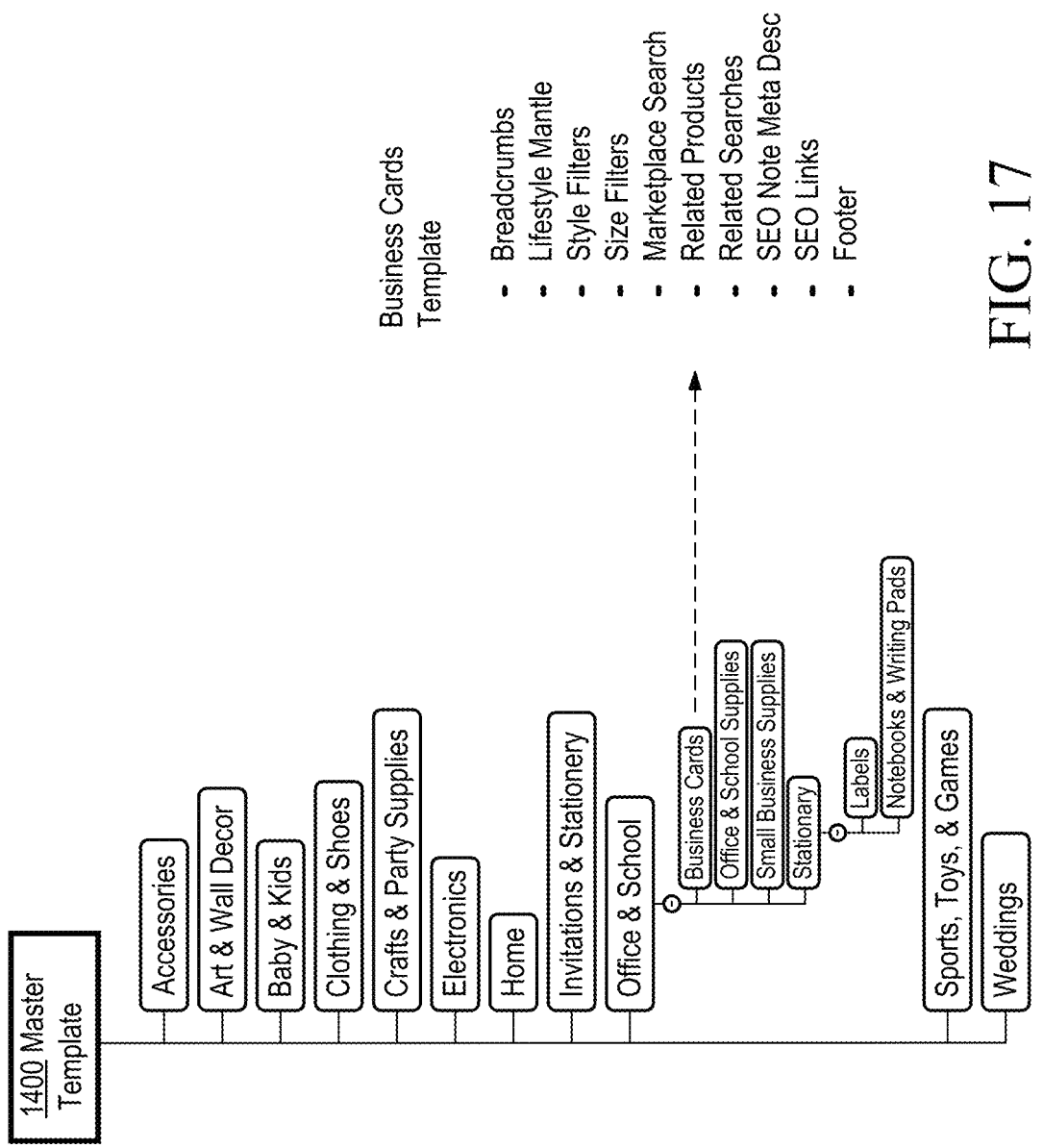
FIG. 17 illustrates examples of templates, according to some embodiments.

FIG. 17 illustrates examples of templates, according to some embodiments. FIG. 17 illustrates examples of templates, according to some embodiments. FIG. 17 illustrates examples of templates, according to some embodiments. In comparison with FIG. 14, FIG. 17 is meant to illustrate that one template is capable of driving many sub-templates and many sub-sub templates, that individually correspond to separate departments handling various types of gifts and that collectively handle a multi-departmental customization enterprise. In the depicted example, an option template 1400 includes a variety of options that are available to a user of an option platform and that include sub-templates and sub-sub-templates. Option template 1400 may include options similar to those in FIG. 14. The depicted examples are provided only for illustration purposes. Other implementations may include other gifts options and products.

Figure 18:
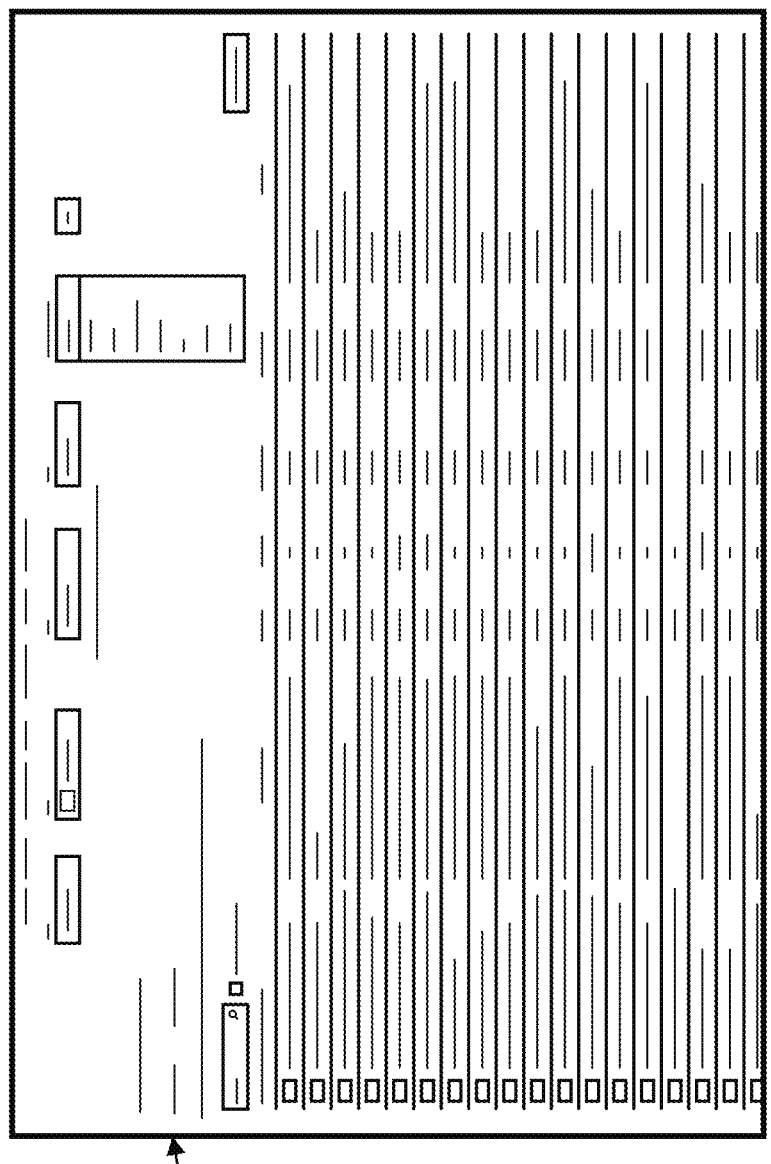
FIG. 18 illustrates an example of a playbook, according to some embodiments.

FIG. 18 illustrates an example of a playbook, according to some embodiments. In the depicted example, a playbook template 1800 provides various functionalities, including a precise intent matching for gift selections, a multi-template selection, a wildcard support, advanced scheduling, and the like. The depicted examples are provided only for illustration purposes. Other implementations may include other gifts options and products.

Figure 19:
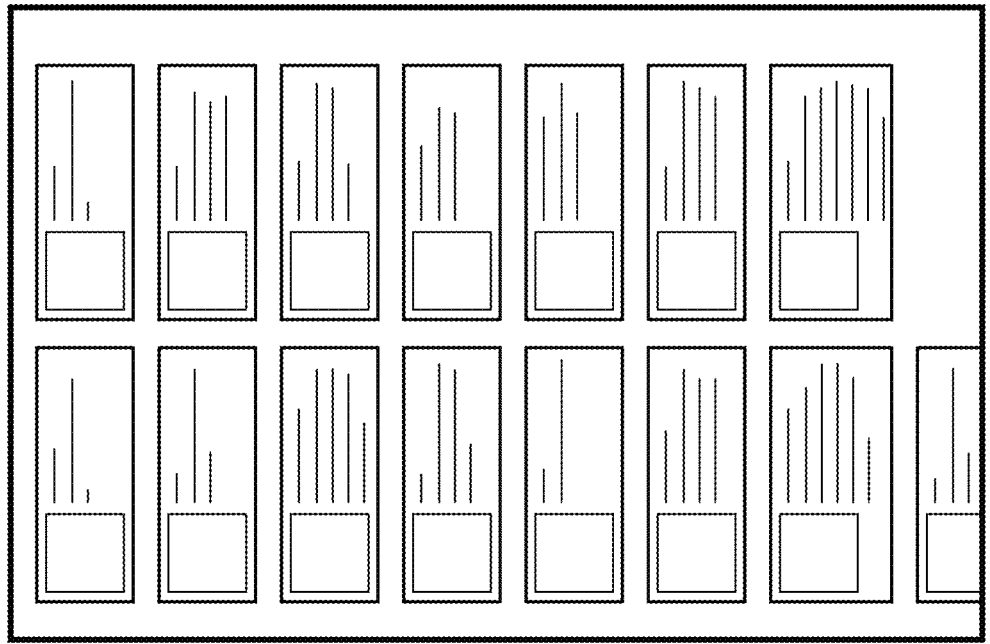
FIG. 19 illustrates examples of product options view set examples, according to some embodiments.
Figure 20:
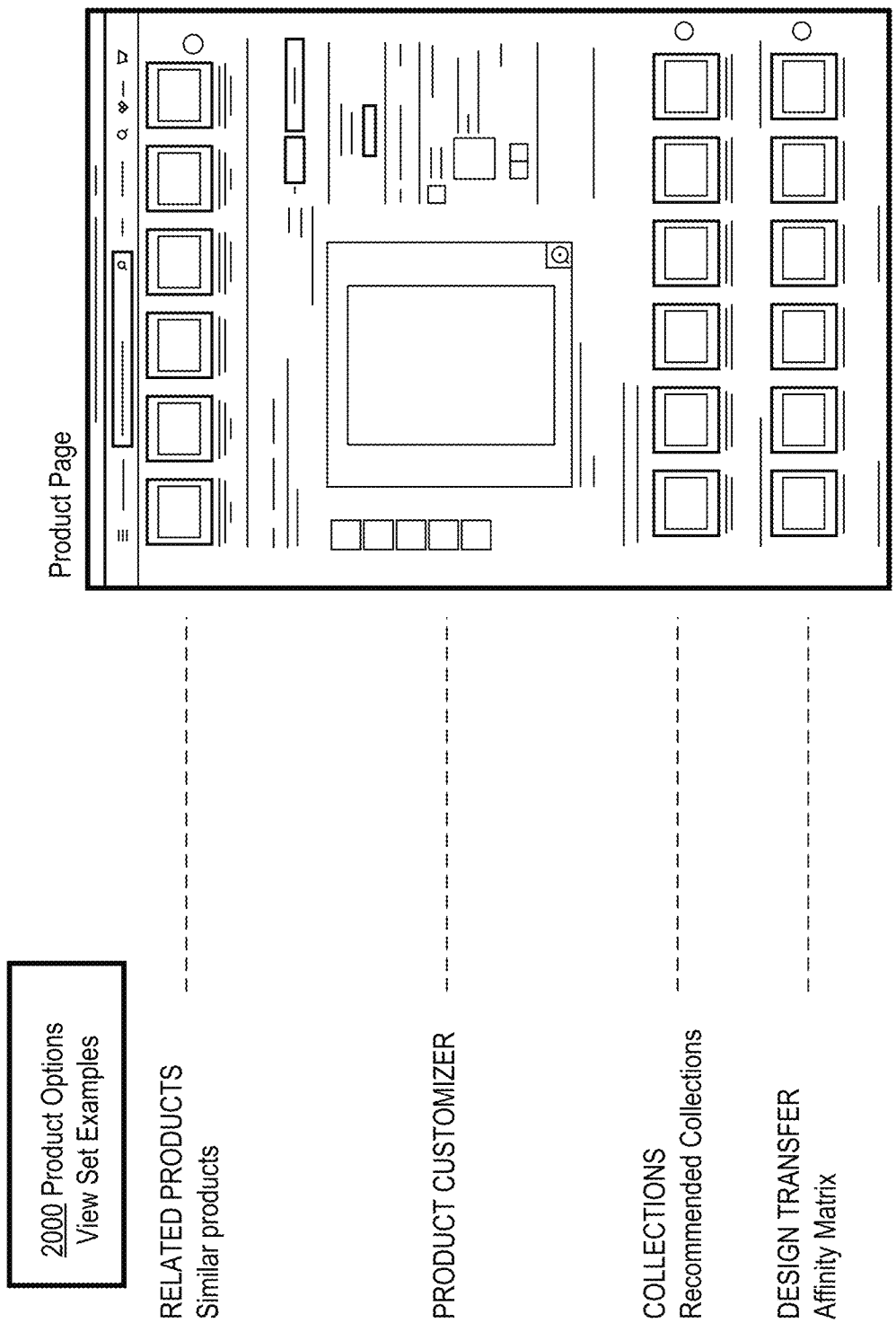
FIG. 20 illustrates an example of a product page, according to some embodiments.

3.3 Accumulating Product Data Based on User Interactions with the Web and Mobile Applications FIG. 19-20 depict various examples of product options and various examples of product pages.

FIG. 19 illustrates examples of product options view set examples, according to some embodiments. In the depicted example, product options view set examples 1900 include a variety of options that are available to a user of an option platform. Product option view set examples 1900 may include, for example, search powered options, content powered options, SEO options, product development options, and the like. The depicted examples are provided only for illustration purposes. Other implementations may include other gifts options and products.

FIG. 20 illustrates an example of a product page, according to some embodiments. In the depicted example, product options view set examples 2000 include a variety of options that are available to a user of an option platform. Product option view set examples 2000 may include, for example, a display of related products, a display of product customization options, a display of recommended collections, a display of design transfer options, and the like. The depicted examples are provided only for illustration purposes. Other implementations may include other gifts options and products.

Figure 21:
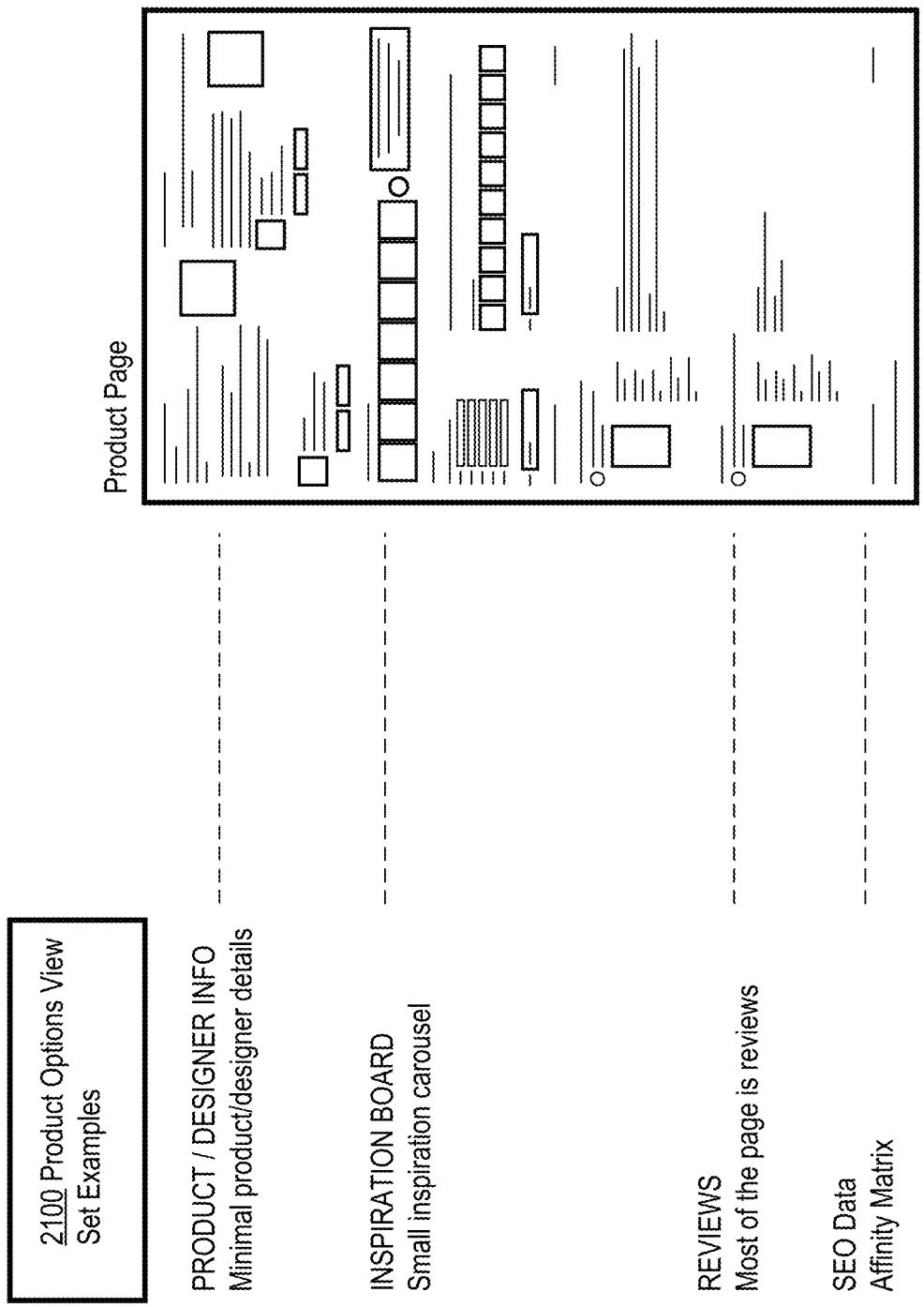
FIG. 21 illustrates an example of a product page, according to some embodiments.

FIG. 21 illustrates an example of a product page, according to some embodiments. In the depicted example, product options view set examples 2100 include a variety of options that are available to a user of an option platform. Product option view set examples 2100 may include, for example, a display of reviews of the products, designers and/or designs, a display of an inspiration board, a display of SEO data (including affinity matrix), and the like. The depicted examples are provided only for illustration purposes. Other implementations may include other gifts options and products.

FIG. 22 illustrates an example of a product page, according to some embodiments. In the depicted example, product options view set examples 2200 include a variety of options that are available to a user of an option platform. Product option view set examples 2200 may include, for example, a display of targeting, recommendations and personalization options, a display of connectivity options, a display of launchpad benefits, and the like. The depicted examples are provided only for illustration purposes. Other implementations may include other gifts options and products.

Figure 23:
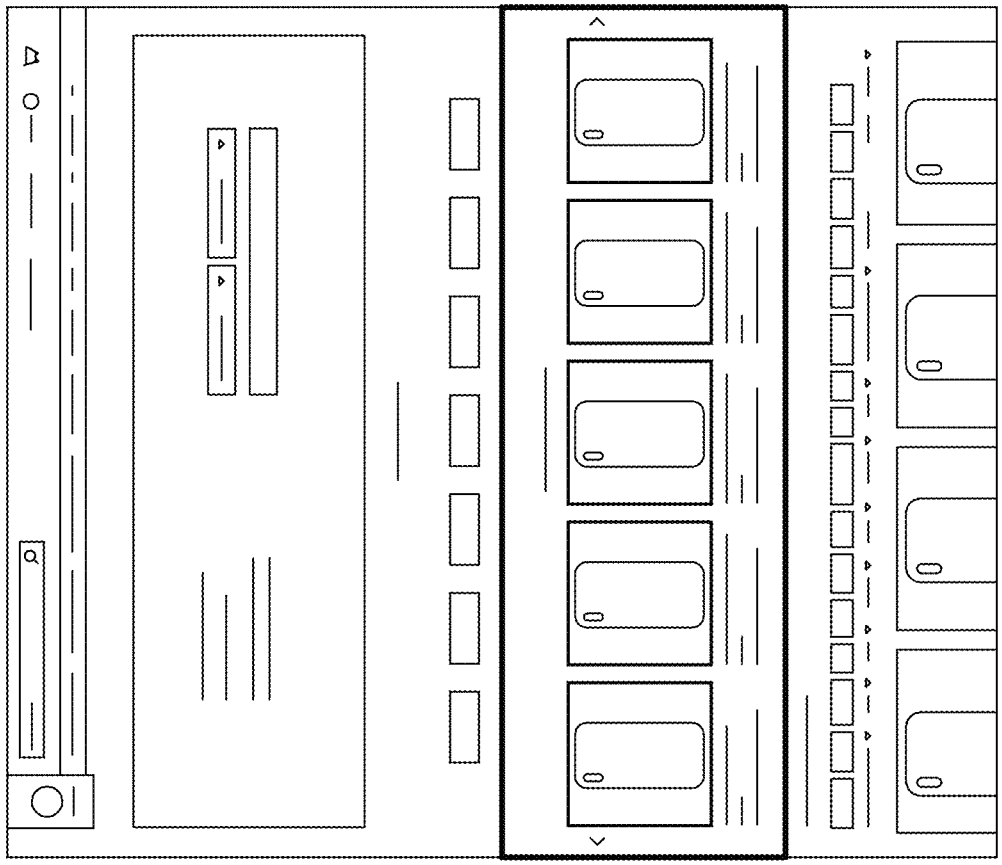
FIG. 23 illustrates examples of product searches, according to some embodiments.

FIG. 23 illustrates examples of product searches, according to some embodiments. In the depicted example, product options view set examples 2300 include a variety of options that are available to a user of an option platform. Product option view set examples 2300 may include, for example, various search options, and the like. The search options may be arranged as a dynamic product carousel based on configurable rule sets. The rule sets may be based on the verified templates, editors' picks, product price ranges, and the like. The depicted examples are provided only for illustration purposes. Other implementations may include other gifts options and products.

FIG. 24A-24D depict various examples of searches and search filters used by product options view platform 1001 shown in FIG. 1.

Figure 24A:
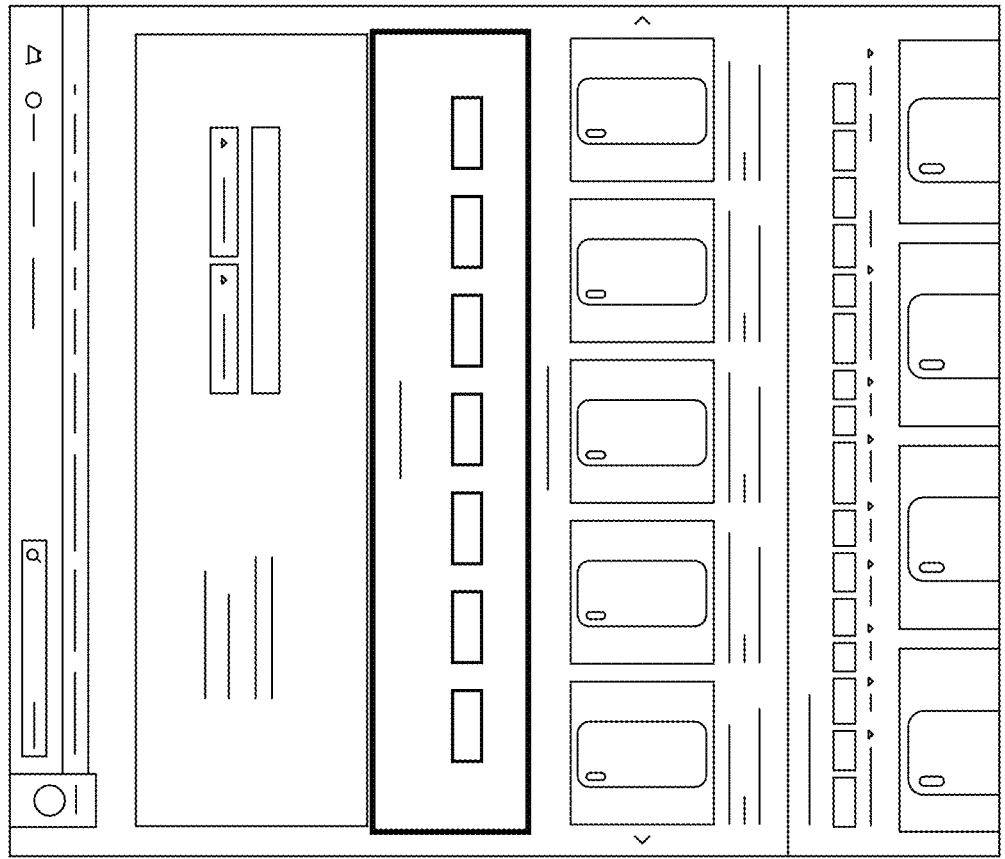
FIG. 24A illustrates an example of a search facet filter, according to some embodiments.

FIG. 24A illustrates an example of a search facet filter, according to some embodiments. In the depicted example, a search facet filter, of product options view set examples 2400A, comprises one or more dynamic search filters that are configured based on a set of rules. The rules may be based on the brand information, prices, styles, models, and the like. The depicted examples are provided only for illustration purposes. Other implementations may include other gifts options and products.

Figure 24B:
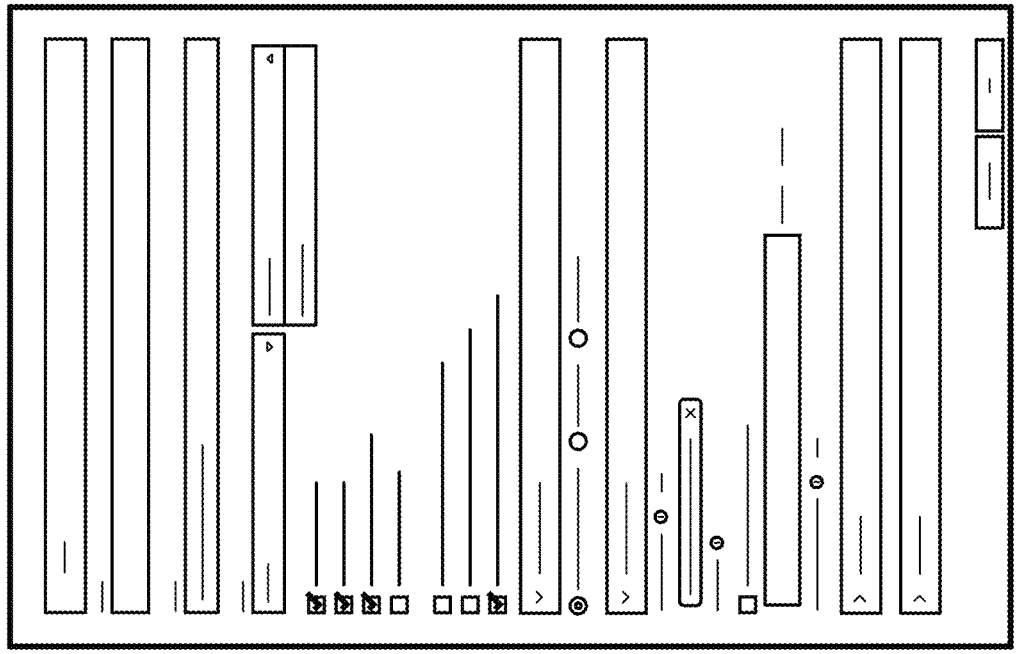
FIG. 24B illustrates an example of a product search, according to some embodiments.

FIG. 24B illustrates an example of a product search, according to some embodiments. In the depicted example, product search options view set examples 2400B include searches by most popular products, by trending products, by new arrivals, by viewed together, by bought together, by recommended by personalized, by similar, and the like. The rules may be based on the brand information, prices, styles, models, and the like. The depicted examples are provided only for illustration purposes. Other implementations may include other gifts options and products.

Figure 24C:
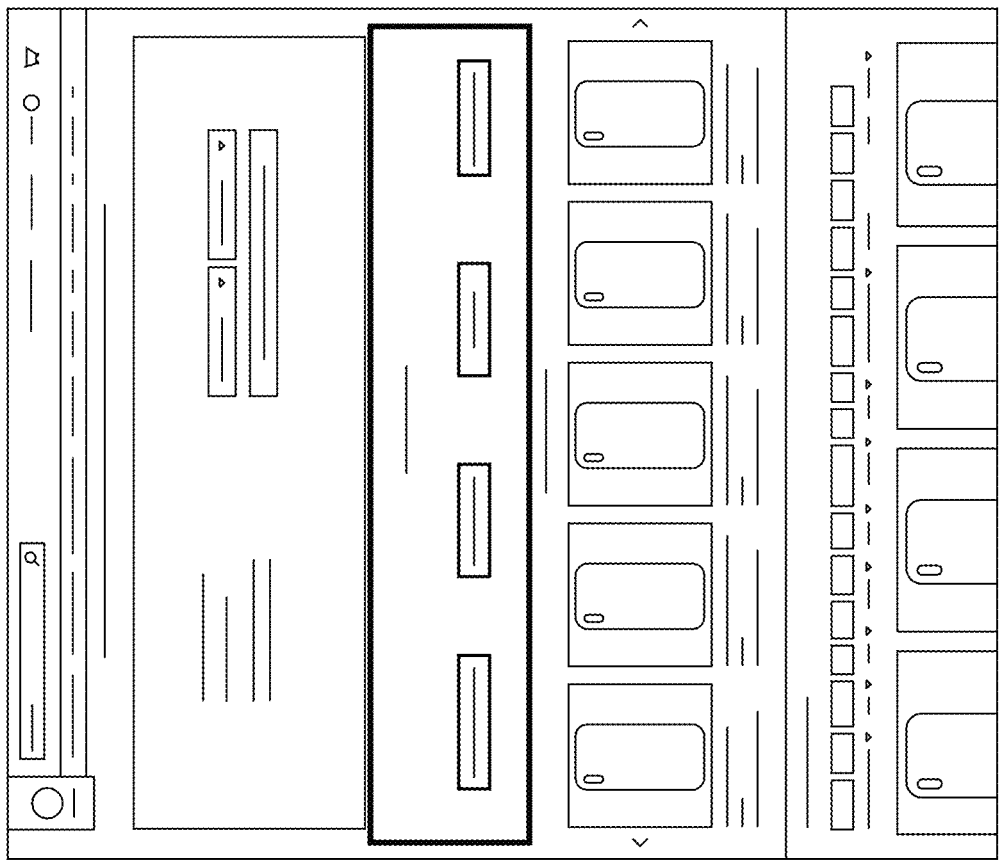
FIG. 24C illustrates examples of filters, according to some embodiments.

FIG. 24C illustrates examples of filters, according to some embodiments. In the depicted example, a search facet filter, of product options view set examples 2400C, comprises one or more dynamic search filters that are configured based on a set of rules. The rules may be based on the brand information, prices, styles, models, and the like. Additional filters may include recommended filters, personalized filters, dynamic filters, and the like. The depicted examples are provided only for illustration purposes. Other implementations may include other gifts options and products.

Figure 24D:
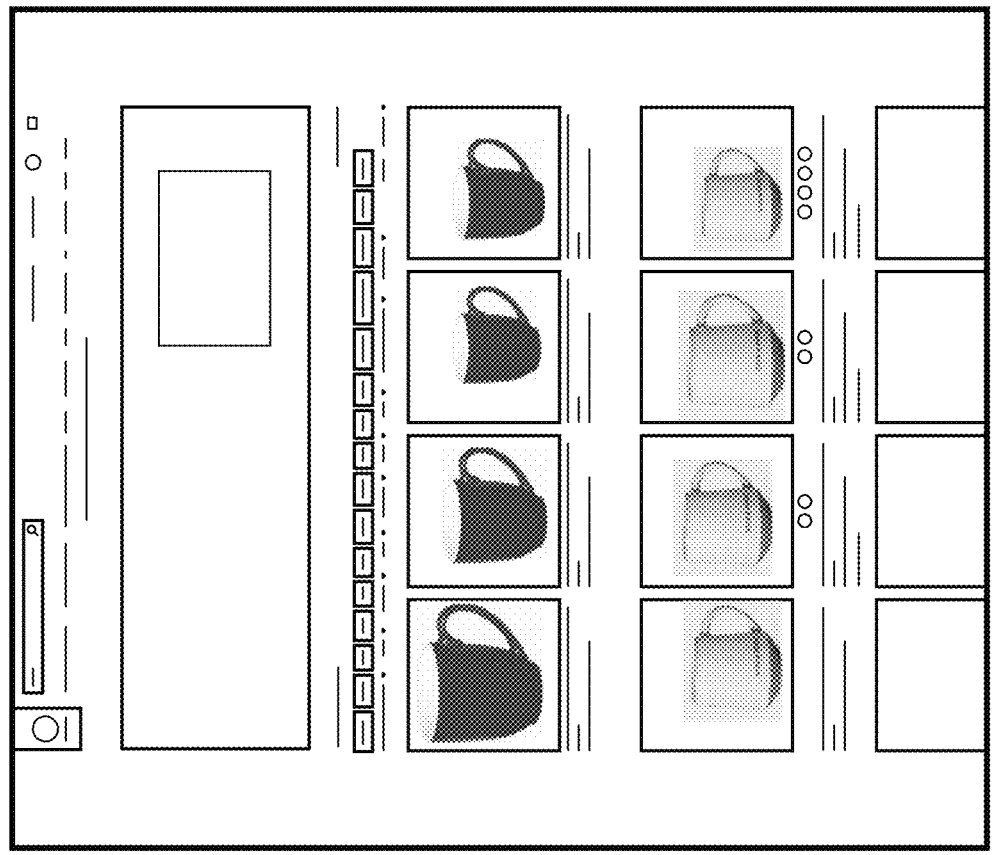
FIG. 24D illustrates an example of an interactive product options view set examples, according to some embodiments.

FIG. 24D illustrates an example of an interactive product options view set example 2400D, according to some embodiments. Specifically, FIG. 24D shows the result of a search for 'Mugs' within the Zazzle application (as compared with arriving at the Zazzle application through an external search). In one embodiment, this view would be created when the search box in the application generates a URL with <Search Term>.s.zazzle.com. This interactive product option view would be created by the <Search Term> trigger which would find high-ranking product templates in the 'Mugs' category and display them. The depicted examples are provided only for illustration purposes. Other implementations may include other gifts options and products.

3.4 Modifying and Annotating the Product Data

Figure 25A:
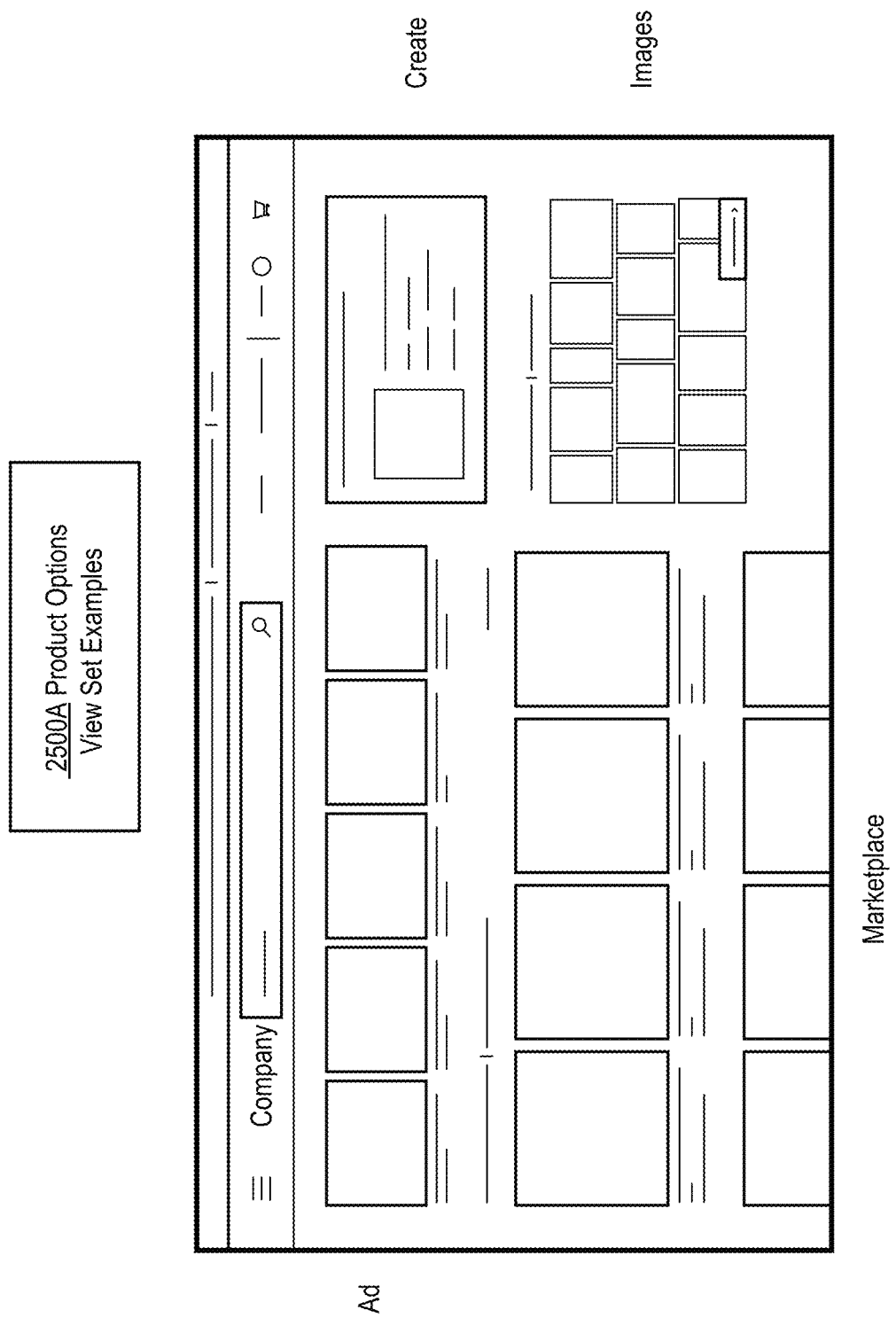
FIG. 25A illustrates interdependencies between product options view sets, marketplace-applications, create-applications, adz-applications, and image-processing-applications, according to some embodiments.

FIG. 25A illustrates interdependencies between product options view set examples 2500A, marketplace-applications, create-applications, ad-applications, and image-processing-applications, according to some embodiments. In the depicted example, some of the options include ad-on application options, create-application options, image-processing application options, marketplace-application options, and the like. The depicted examples are provided only for illustration purposes. Other implementations may include other gifts options and products.

3.5 Rendering Digital Views of the Product

In some embodiments, an approach for rendering a digital view of the customized product is presented. Rendering details are described in section 8.0.

4.0 Product Options View User Logs

In some embodiments, as a user navigates through the pages displayed for the user, the user's choices of the pages and the paths that the user followed as he navigated through the pages are recorded and the information about them is stored in a database. For example, suppose that a user started from a master page displayed in a user interface executing on product options view platform 1001. Furthermore, suppose that the master page shows various offerings, including accessories offerings, invitation and stationary offerings, office and school offerings, and so forth. Moreover, suppose that from the master page, the user selected the office and school offerings. This selection may be noted, and a record may be created to indicate that the user is interested in the office and school offerings.

Furthermore, suppose that the page showing the office and school offerings shows various offerings, including business cards offerings, office and school supplies offerings, small business supplies offerings, stationary offerings, and the like. Moreover, suppose that from the page showing the office and school offerings, the user selected the stationary offerings. This selection may be noted, and a record may be created to indicate that the user is interested in the stationary offerings.

Next, suppose that the page showing the stationary offerings shows various offerings, including labels offerings, notebooks offerings, writing pads offerings, and the like. Suppose that from the page showing the labels offerings, the notebooks offerings and the writing pads offerings, the user selected the labels offering. This selection may be noted, and a record may be created to indicate that the user is interested in the label's offerings.

This process may continue as long as the pages provide selectable items and as long as the user makes selections as he navigates through the pages displayed by the user interface. By automatically recording the user's selections, the system collects information about the user preferences, and about the options of the product that the user might want to customize.

5.0 Product Options View Set Triggers

In some embodiments, as the user interacts with the user interface and explores various popular offerings of products, seasonal offerings of products, and other offerings, the items and combinations that the user's selections are recorded. The recorded information is enhanced by the information about the user's history, the user's profile, the user's purchasing habits, and the user' preferences to automatically form a body of knowledge about the user and the products that the user is interested in.

In some embodiments, the body of knowledge about the user and the products that the user is interested in is used to automatically generate triggers. A trigger is a piece of information that provides an indication of a product that the user is interested in, or about the product's attribute value. For example, if the user has been exploring the seasonal offering related to birthdays and browsed the web pages showing various birthday cards depicting cards for mothers, then the automatically generated body of knowledge may be used to generate a trigger indicating that the user is interested in purchasing a birthday card for his mother, and the like.

Additional triggers may include the triggers that can be generated based on the user's history, the user's profile, the user's purchasing habits, and so forth. For example, if in the past, the user used to purchase birthday cards for grandparents, then an additional trigger may be automatically generated to indicate the user's interest in the birthday cards for grandparents. Other triggers may also be generated.

In some embodiments, a trigger may be implemented as digital code that is called when a user views a graphical user interface to find a custom product. The trigger, as defined above, may be tied to previous user actions. For instance, a user may have searched for, and visited a product category for printed invitations. Additionally, another trigger, based on a user's search keyword may indicate that the user searched for custom products for an event, such as a wedding. Additionally, another trigger may indicate the user's name. In many cases a plurality of triggers may be present when a user views a graphical user interface to find a custom product.

5.1 Constructing a Set of Software Triggers Based on the Accumulated Data

In some embodiments, the information accumulated and recorded as the user was interacting with the user interface and exploring various options for a product customization is used to construct a set of software triggers. Examples of various triggers are described below.

5.1.1 Triggers Based on Product Options View Sets

In some embodiments, software triggers generated based on data accumulated and recorded as the user was interacting with the user interface and exploring various options for a product customization include the triggers pertaining to product options view sets. These triggers may include the triggers generated as the user selected various customization options, various objects that may be customized, and the like.

5.1.2 Triggers Based on Product Options View User Logs

Some triggers may include the triggers that are based on the product options view user logs. Those triggers may include the triggers that have been generated each time the user logged into the marketplace website, selects customized products, purchased some products, and the like.

5.1.2.1 Triggers Based on a User Presence on the Site

In some embodiments, the triggers include the triggers generated based on the user's profile indicating when the user logged into the marketplace website, how often the user logs into the marketplace website, how long the user remains logged in, whether the user had comments about his experience with the website, and the like.

5.1.2.2 Triggers Based on Purchases Using the Site

In some embodiments, the triggers include the triggers generated based on the purchase history of the purchases made by the user. These triggers may include the triggers indicating the type of items the user purchased, the cost of the purchased items, the type of customization that the user applied, and the like.

5.1.2.3 Triggers Based on Lack of Interactions with the Site

In some embodiments, the triggers include the triggers indicating that, for example, the user is a first time user of the marketplace website, or that the user just purchased the website membership, and the like.

6.0 Visual Product Options View Set Logic Editor

A visual product options view set may implement a logic editor. This feature may allow reviewing the accumulated data, reviewing the triggers generated for the accumulated data, and pruning, for example, the redundant data or the conflicting data.

7.0 Product View Renderer

7.1 A Real View

Figure 25C:
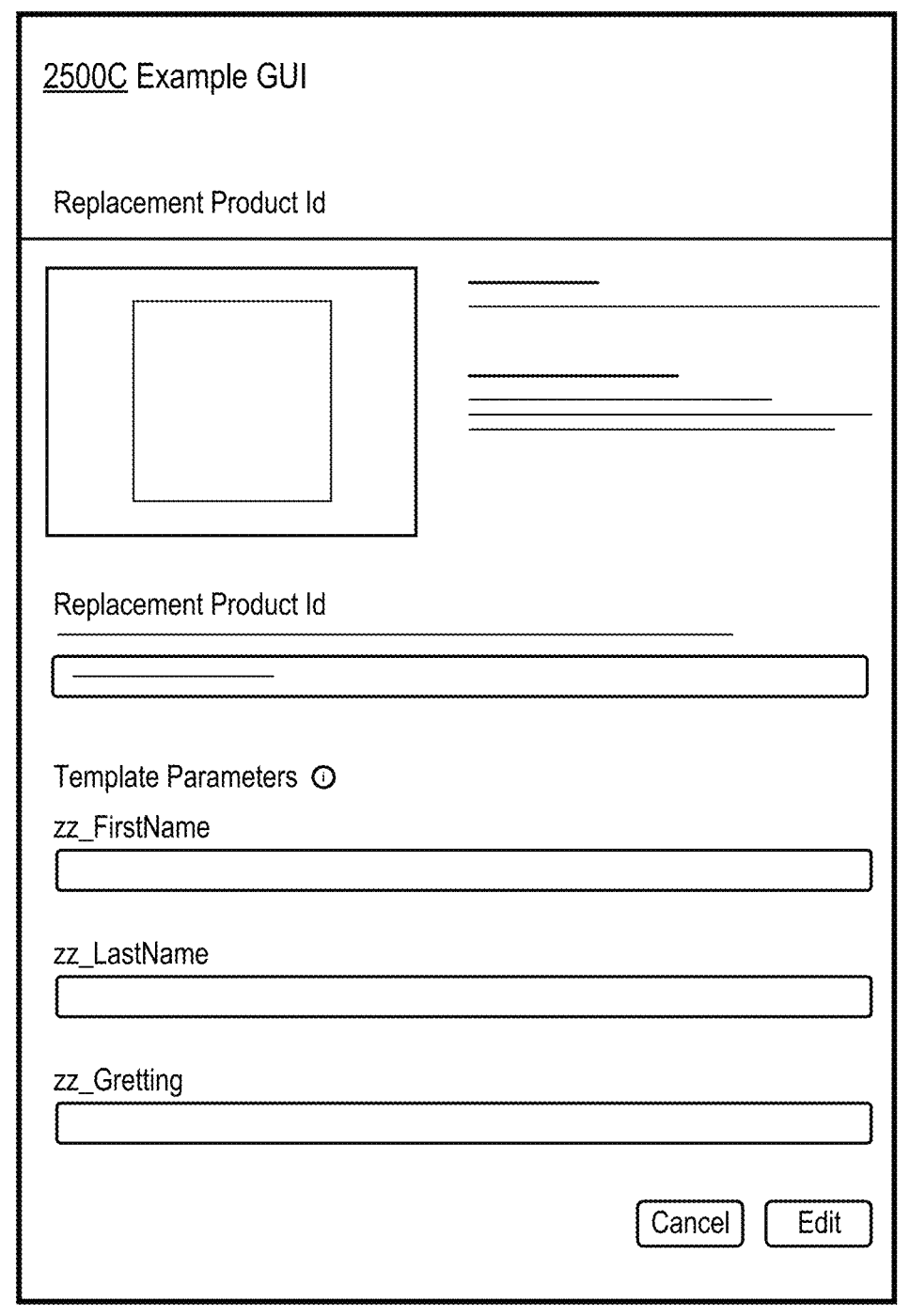

FIG. 25B-25C depict examples of the process for generating Real Views.

FIG. 25B illustrates an example of a dynamic RealView, according to some embodiments. In the depicted example, an example GUI 2500B, comprises a plurality of text boxes, interactive input boxes, selection buttons, description boxes, and the like. The boxes may facilitate entering data into the option platform, providing selections of the options, providing selections of the products, providing selections of attributes of the products, and the like. The depicted examples are provided only for illustration purposes. Other implementations may include other gifts options and products.

FIG. 25C illustrates an example of a replacement product ID process, according to some embodiments. In the depicted example, an example GUI 2500C, comprises a plurality of text boxes, interactive input boxes, selection buttons, description boxes, and the like. The boxes may facilitate entering data into the option platform, providing selections of the options, providing selections of the products, providing selections of attributes of the products, and the like.

In some embodiments, a RealView is a rendering of a physical product based on, for example, product options view set that is automatically generated as a user interacts with an interface integrated in a product design application. The product options view set may include various types of information. Non-limiting examples of the information types included in the product options view set include product identifiers (PIDs) of one or more products that the user is interested in as the user interacts with the interface.

In some embodiments, dynamic RealView assets are used to allow users to replace the PIDs with similar ones of their choosing. Example requirements of the replacing process may include:

This functionality should be added to the following mantle objects:
Text On Content (including Portal Launchpads)
Text Besides Content
Image
Add a new textfield below the "Or Use Image GUID" textfield called "Dynamic RealView Asset" (see mockup)
This should allow the user to specify the RealView Id they'd like to use and will initially be selected from this [google spreadsheet|https://docs.google.com/spreadsheets/d/1Y5MNCBQKTqakDpp1TMA7v0K2dCdvfWwzGws-_ODAus0/edit#gid=0]
Dynamic RealView PIDs Table
This table shows data for the selected PIDs similar to the Clickable Area and Hotspot tables
Only appears once a RealView Id has been added
After adding a RealView Id the table should automatically get populated with a row for each PID in the RealView
The initial rows can follow the format: PID→Product Type→Product Options
In the case that RealView doesn't contain default PIDs then don't show that field
Should probably only allow edit as the row action as not sure we'd reconnect if they deleted a row
After the user has selected PIDs/template fields then we can use the format:
Format: PID→Product Type→Template Param 1 Name: Template Param 1 Value→Template Param n:Template Param n Value
Realtime asset checkbox—when enabled this setting will look for any url template parameters that match the PID template values and use those to dynamically generate an asset on the fly.
If enabled, the user can still manually input some template values, but they will be overridden if any matching URL template parameters exist.
Defaults to false
Helper Text: "Enabling this setting will allow the asset to use any matching template values that are passed in through the URL. +Example:+ Let's say you have a PID with a template field called zz_Name that is used to personalize the name on that product. If the URL that triggers this launchpad contains a parameter with the same template field e.g. zz_Name=John, then the Dynamic RealView will use the value "John" for that template field when generating the image."
Generate Image—this button will use the PID/templates values added to generate the image guid that will be used onsite.
Replacement Product Id dialog
Product RealView—shows the RealView for the selected product. Ideally this also updates when/if they update template values. Opening up the PID in a new tab when clicking the image could also be a nice convenience.
Source Product—shows the same string we show in the About this Product on the PDP e.g., size and product type name
Source Product Options—getCurrentProductOption( )
Replacement Product Id—the PID to use.
Ideally there is some validation to make sure this is at least the same product type.
[Bonus] validate against the same product options and display a warning if these are different
Message: "The product specified has different product options than the source product so results may vary. Please inspect the RealView for any issues before enabling this schedule."
Template Parameters—this is a list of all the template values defined for this PID
Allows the user to manually specify the values to use for each of these template fields.
If the "Realtime asset checkbox" mentioned above is enabled then the asset will dynamically inherit any_matching_template parameters that are passed from a previous template/launchpad e.g., image/text from an interactive launchpad.
(v2) These fields should also support Smart Tokens (LAUNCH-1068
Helper Text: "Specify values to override the available template fields. Leaving them black will use the default values or inherit any matching parameter values passed over from another launchpad."
Hotspot & Clickable Areas—should support these features. (we'll need to enable these features for the Text On Content mantle object)
Live Preview Image—would be great if we could keep the preview image in the edit dialog as well as the asset used when viewing the launchpad to show the RealView zig with the replaced PIDs
[Bonus] Upon saving the mantle, check to see if the user has changed any dynamic PID data but has not generated a new image. If yes, can we display a warning dialog:
Message: It looks like you've changed the dynamic PID data but haven't generated a new image. Please use the "Generate Image" button to create a new image with the latest data or discard changes to keep the existing image.
CTAs: "Discard Changes" (Secondary), "Go Back" (Primary)

7.2 A Design View

In some embodiments, a DesignView is a view generated based on product options described in using a product options framework. The product options framework and the DesignView are described in detail in the preceding sections.

8.0 Flexible Framework for Defining and Customizing Products and Accessories According to techniques described herein, a system may be configured to offer users the opportunity to order products having arbitrary attribute values. For example, in the case of custom manufactured framed products such as photos, digital images, artwork, and other frameable images, the system may offer users the opportunity to order images and frames having arbitrary sizes. Thus, rather than restricting users to ordering products in fixed sizes such as 33×10 inches, 20×30 inches, etc., the system may permit a user to request products in arbitrary sizes such as 33.5×29.3 inches. Accordingly, the customizable products may be offered in a continuously variable range of values so that it is impracticable to represent all possible dimensions of products as discrete values in an RDBMS. When an attribute value may fall anywhere within a continuous spectrum of a specified range (e.g., 4 inches to 48 inches), the number of unique possible values that a customer could specify would be extremely expensive, if not impossible, to store.

In other embodiments, the system may be configured to offer the user the option to purchase only selected products that are known to be compatible with the first product. Still further, when a particular first product having specified first attributes is selected, the system may modify the attributes of a second product or make certain attributes unavailable for the second product. Still further, the system may offer the user a default product option or a particular default attribute in order to simplify the ordering process and ensure that completed orders are accurate.

Further, if products can have dimensions that are represented in any of a continuous range of values, then determining whether one product is compatible with another product may be extremely challenging. The selection of an arbitrary value may have implications for other attribute values of the final custom product and how an image of the final custom product should be rendered. For example, if a user is ordering a framed print that is 6 inches in one dimension, then it may be inappropriate to offer the user the option to purchase a frame or mat combination that cannot fit the dimensions that have been ordered. As another example, it may be impossible to cut glazing or other products to manufacture products in particular specified sizes. As another example, certain papers cannot be cut in particular dimensions and ordering a particular paper for a mat of a particular size may require a different kind of manufacturing process. The constraints may be interrelated, adding to the complexity of the system.

According to techniques described herein, such constraints may be efficiently represented in an information model that allows for great flexibility in designing custom products. In some embodiments, at the time that a user is designing a product, the system queries a database of products or other information modeling elements about what attributes and related products, or accessories, are valid or otherwise allowed. The database or other information modeling elements may provide a way to prune a result set of products that are compatible; the result set also may limit or modify the product under design.

Figure 26:
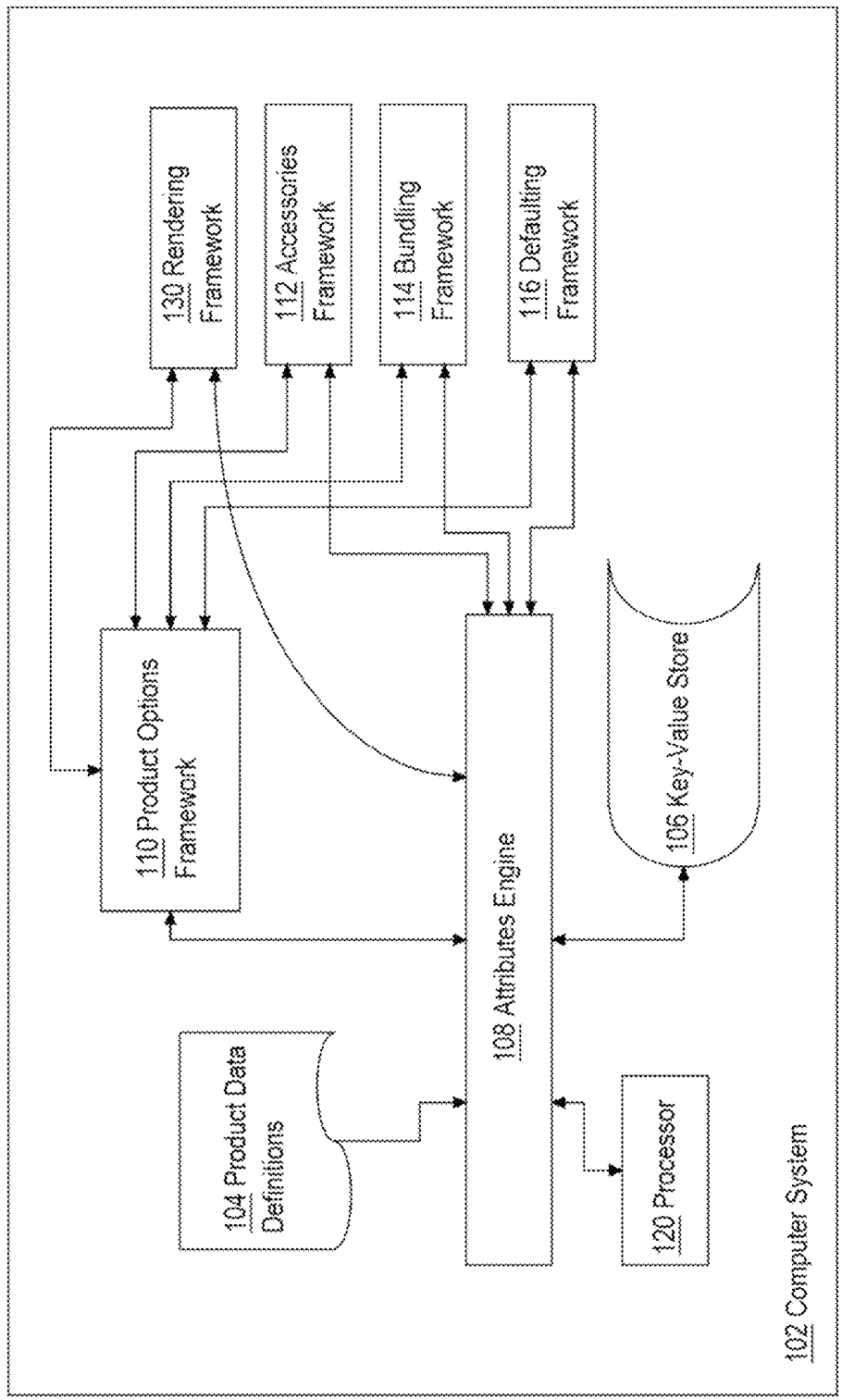
FIG. 26 illustrates a system including an attributes engine and product options framework for modeling custom products.

FIG. 26 illustrates a system including an attributes engine and product options framework for modeling custom products that may implement various embodiments. Computer system 332 comprises a plurality of product data definitions 334 that are processed using attributes engine 338 and stored in key-value store 336. A processor 120, which may comprise a central processing unit (CPU) or multiple CPU cores of a server computer, hosts or other computing devices executes the attributes engine 338 as well as a product options framework 110, accessories framework 112, bundling framework 114, defaulting framework 116 and rendering framework 130. Each of the accessories-framework 112, bundling framework 114, defaulting framework 116 and rendering framework 130 is coupled to and capable of accessing functions provided in the product options framework 110. Each of the attribute's engine 338 and frameworks 110, 112, 114, 116, 130 may comprise a set of inter-operable computer programs in the form of object-oriented classes, data definitions, and database procedures; each of the frameworks may expose an application programming interface (API) of functions that are callable by methods of other frameworks. In some embodiments one or more elements of FIG. 26 may be omitted or combined with other elements, depending on the implementation. In addition, computer system 332 may include additional elements and logic, depending on the implementation, that are not illustrated for purposes of brevity.

In some embodiments, elements including without limitation the attribute engine and elements discussed above and termed "framework" may be implemented in the form of computer program instructions that are stored or recorded in one or more non-transitory storage media and later loaded into the memory of a general-purpose computer or special-purpose computer and executed by processor 120. Each element of logic may comprise or be represented in the form or content of the electronic digital memory, registers, or processors of the computer upon execution of the instructions. In another embodiment, each of these elements may be implemented in the form of electronic digital circuit logic using one or more application-specific integrated circuits (ASICs), field programmable gate arrays (FPGAs), or other hardware elements, including those described further herein with reference to FIG. 26. Each element of FIG. 26 is described in further detail below.

8.1 Attributes Engine: Key-Value Descriptions and Options Strings

In some embodiments, attribute engine 338 is configured with logic that supports a specified syntax that can flexibly describe product characteristics and their constraints. Product options framework 110 may use attribute engine 338 to determine how a custom product is currently defined, the restrictions and other constraints on how the custom product may be defined, and/or the relationship of the custom product to other products and render files.

In some embodiments, the specified syntax supported by attribute engine 338 is a key-value syntax that allows product characteristics and constraints to be described as a set of keys and values. A key may represent a particular attribute that may be used to describe one or more products. Each key may be associated with a particular value or a legal set of values, where a value represents a specific characteristic of the corresponding attribute. For example, in the case of a custom printed or manufactured shirt, the product may be described using keys including, without limitation, style, color, and size attributes. There may be 50 available values for the style attribute, 33 values for color, and 5 values for size, but not all permutations of the values may be available or capable of ordering.

A legal set of values for each key may be specified as a discrete set of values, a range of values, a computed set of values, or through any other suitable mechanism, depending on the implementation.

In some embodiments, an extensional syntax may be used to specify the legal set of values as a discrete set. The extensional syntax may comprise any suitable syntax for enumerating or otherwise defining each value that forms the legal set of values. For example, in the case of the custom manufactured or printed shirt, the legal set of values may be specified as three discrete values: red, green, or blue. Thus, a selection of any three of these values would constitute an available option. However, in the present example, a different color, such as yellow, would constitute an illegal value that is unavailable for the corresponding product attribute.

In some embodiments, an intentional syntax may be used to specify the legal set of values as a continuous range of values. Any arbitrary value that falls within the continuous range may be permitted as a legal value. Referring again to the case of the custom manufactured or printed shirt, the legal set of values may be specified as any RGB value between 0 and 256. Thus, any RGB value within the range 0 to 256 may constitute a valid color choice, and RGB values outside the specified range would be invalid. In another example, the product may be a print in which the width and height may be continuous values within bounds. Thus, the user may specify any arbitrary width or height for the print within the legal bounds.

A computed value may be any value or set of values that is computed based on an evaluation function. The computation may occur in real-time as a user is designing a custom product. For example, the evaluation function may compute the surface area of a custom print based on a width and height input. Once the surface area has been computed, the evaluation function may further classify the print as small, medium, or large, depending on the computed surface area.

In some embodiments, each key may be associated with a namespace. A namespace may represent any particular product or class of product such as Shirt, Print, Frames, etc. Each namespace may be associated with a plurality of attribute definitions for potential attributes of custom products within the namespace. Consequently, by declarations of attributes and allowed values, it is possible for attribute engine 338 to describe a large range of products.

The key-value syntax is capable of serialization or expression in a text string and is capable of participating in matching operations as further described. A product options framework as further described herein may implement set mathematics to accomplish matching operations. The matching operations may be used for a variety of purposes, including, without limitation, matching custom product definitions to accessory filters, default filters, and render files.

As an example, a key-value expression may comprise:

style=basic & color=white & size=large [1]

in which the character = is an operator and & is a separator. In this example and all other examples herein, bracketed numbers such as [1] merely identify an expression for purposes of the description herein and the bracketed numbers do not form a part of an expression or a syntax definition of expressions. The description [1] would match the following other expressions:

style=basic [2]

style={basic, dark, hooded} [3]

A match occurs because there is no conflict in set membership between the first expression and either the second or third expressions. In some embodiments, the product options framework may dynamically form expressions of the form of [1] and could potentially create and transiently store many such expressions. Expression [2] could be applied to a matching function to filter the stored expressions and generate a result set of only those stored expressions in which style=basic. Similarly, expression [3] may be used to filter the stored expressions into a result set in which the Style attribute is any of the specified set members.

In some embodiments, an expression may describe a product attribute as a computed value. For example, a Print product may have attributes of Width, Height, and Media. One expression associated with a Print product could be:

width={>=8,<=60} [4]

Thus, indicating that potential matches for the width may be greater than or equal to 33 units and less than or equal to 60 units; the units may be inches, centimeters, or other linear measurement units. In a traditional RDBMS approach, programming code would be required to achieve an equivalent expression or description of products whereas in the present approach a declaration may be used that is processed by a generalized matching function and other generalized framework functions.

Operators that connect keys and values may express equality, inequality, or constrained equality. For example, expressions may use:

key=value—to express equality to a value that is not required to be present [5]

key!=value—to express inequality [6]

key:=value—to express equality to a value that must be present [7]

For example, the expression style={basic, dark, fitted} & size!={small} [8]

would match Shirts having a style of basic, dark, or fitted and not in a small size.

In some embodiments, a description of a product using a key-value expression of the specified syntax may be used to retrieve other information about the product, such as pricing, or other attributes of a product in which particular attribute values are not known in advance. A benefit of this approach is that new products or attribute values may be introduced into the system merely using new declarative expressions, rather than with complex programming. For example, adding a new product attribute that results in a product pricing change merely requires updating a Price attribute for that attribute and updating relatively simple conditional logic in a pricing table, for example, "when Product has Widget then Price is $29.95") rather than updating program logic or complex database tables.

Consequently, the number of products described in the complete computer system may be increased rapidly without an extensive number of programming changes. Declarative statements that capture simple business statements such as "all Shirts that are Large or Medium have Price P" or all "Widgets that are Green cause Price to increase by $10." These statements can be created and entered by business analysts rather than software engineers and may be used within the programmatic framework in the form of serialized statements that express key-value pairs combined using operators as shown above.

In some embodiments, the matching logic may use expressions of the form of [5], [6] and [7] above to create and store a count of actual matches between attribute values in a string that comprises two or more attributes; the resulting count expresses a degree of closeness in matching or how good a match exists between expressions. For instance, the closeness in matching may be determined based on the percentage of expressions of the form of [5] are satisfied. An expression of the degree of closeness of a match or accomplishing inexact matches between expressions in which some attribute values are present, and others are not, typically is not inherently implemented in a traditional RDBMS.

In some embodiments, the expression syntax and associated matching logic and other programmatic framework elements support declaring titles for products and contexts for products. For example, assume that a product is declared as:

[style=basic & color=white & size=large]  [9]

A plurality of contexts also may be defined as:

[region=us & currency=usd]  [10]

[region=gb & currency=gbp]  [11]

Other examples of context include Site or Seller. For example, the same product processed by the platform may be treated differently depending on the offering website or the identity of the seller. For example, if the seller is Disney®, then only Disney® origin products could be offered by applying a filter to an attribute that describes the licensor, manufacturer, or other entity of origin for a particular product.

The product may have a title, price, and default values. For example, expression [10] may be the default context and [11] may be an overriding alternative context. Any number of contexts may be defined and used. For example, if an end user or customer located in Great Britain connects to a server computer implementing the techniques herein, then the server computer may retrieve [11] as the default context and pass that context string into matching functions that perform filtering functions or other determining functions. Inexact or approximate matches may result, and the count of matching attributes may be used to drive data filtering or responsive messages or actions. For example, with [11] if the current user is in Great Britain but has selected Euros as a currency, expression [11] would not match and the system could throw an exception or present a corrective message.

Using this structure, continuous refinements may be introduced into product definitions over time without extensive programming or modification of database tables.

In some embodiments, the set matching logic returns a match when a second set is a complete subset of a first set. For example, the set {basic, dark} is a match to expression [8] above. In contrast, {basic, light} is not a match. In embodiment, the set matching logic is configured to enforce ordered lists. For example, for a print product, the notation [width, height] specifies an ordered list of dimensions and the declaration [8, 11] does not match [11, 33].

8.2 Product Options Framework

In some embodiments, a product options framework may be configured to enable defining products to facilitate the functions described above. The product options framework is a specific example of the attribute engine described above to process or determine whether one product is compatible with a second product as an accessory or related product. The framework may interoperate with expressions in the key-value based syntax for defining product attributes and relationships and specifying expressions that can be matched to other values. The framework may provide ways to declare dependencies, defaults, and filters for matching a first product to one or more second compatible products, for example, accessories to the first product. These approaches can overcome the failings of the traditional RDBMS approaches described above. Further, the approaches allow adding new and complex product descriptions efficiently using configuration values rather than custom programming.

Figure 27A:
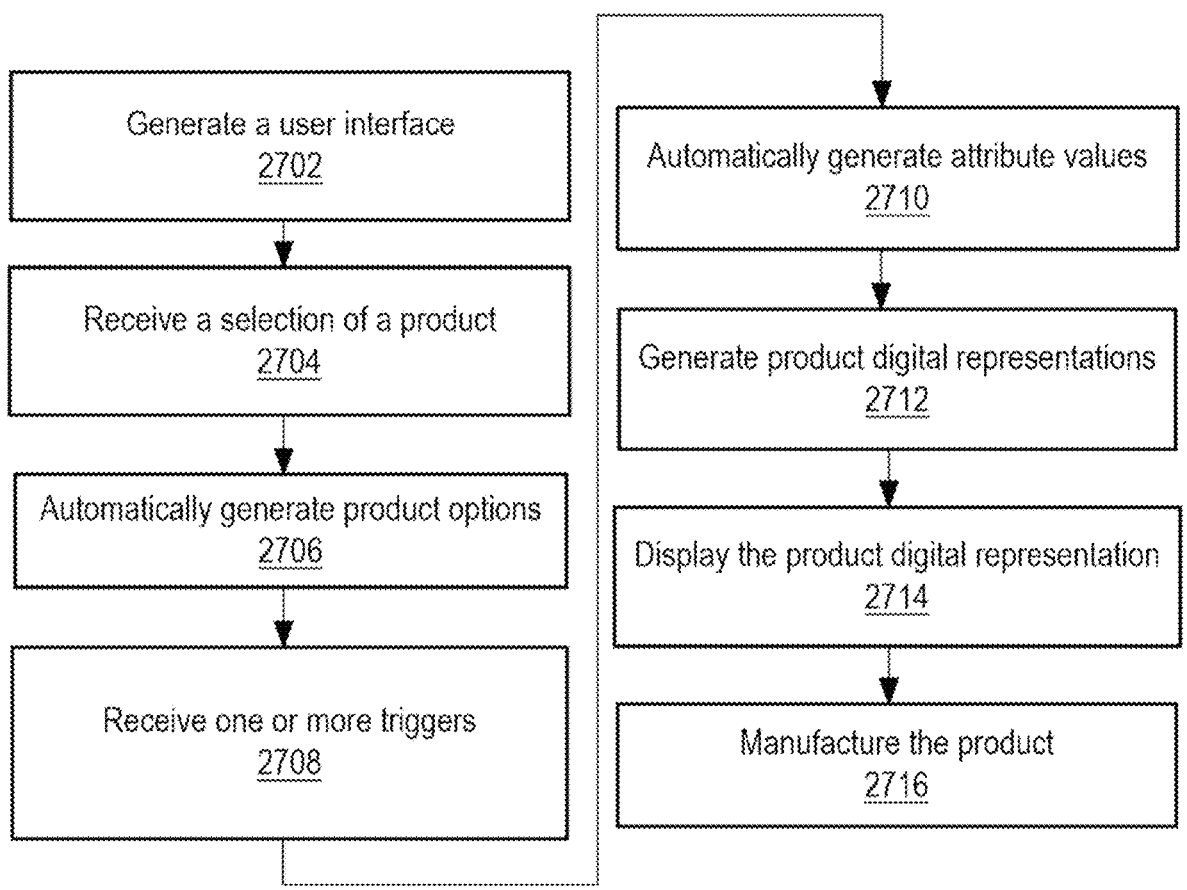
FIG. 27A is a flowchart illustrating an example process for a method for automatically configuring custom product options based on user actions.

FIG. 27A is a flowchart illustrating an example process for a method for automatically configuring custom product options based on user actions. In step 2702, a computer collaboration platform generates a user interface configured to allow selecting a product from a plurality of products that are customizable and displaying the user interface on a display device of a user computer.

In step 2704, the platform receives, via the user interface, a selection of a particular product, from the plurality of products, that require customization.

In response to receiving the selection of the particular product, the platform, in step 2706, automatically generates a plurality of customization options available for customizing the particular product.

In step 2708, the platform receives one or more triggers of a plurality of triggers, generated based on one or more customization options selected from the plurality of customization options.

In step 2710, based on, at least in part, the one or more triggers and one or more customization attributes associated with the one or more customization options, the platform automatically generates one or more corresponding customization attribute values for the product.

In step 2712, based on, at least in part, the triggers and the one or more corresponding customization attribute values, the platform automatically generates one or more digital representations of the product.

In step 2716, the platform proceeds to manufacturing the product. The manufacturing is described in detail later.

Figure 27B:
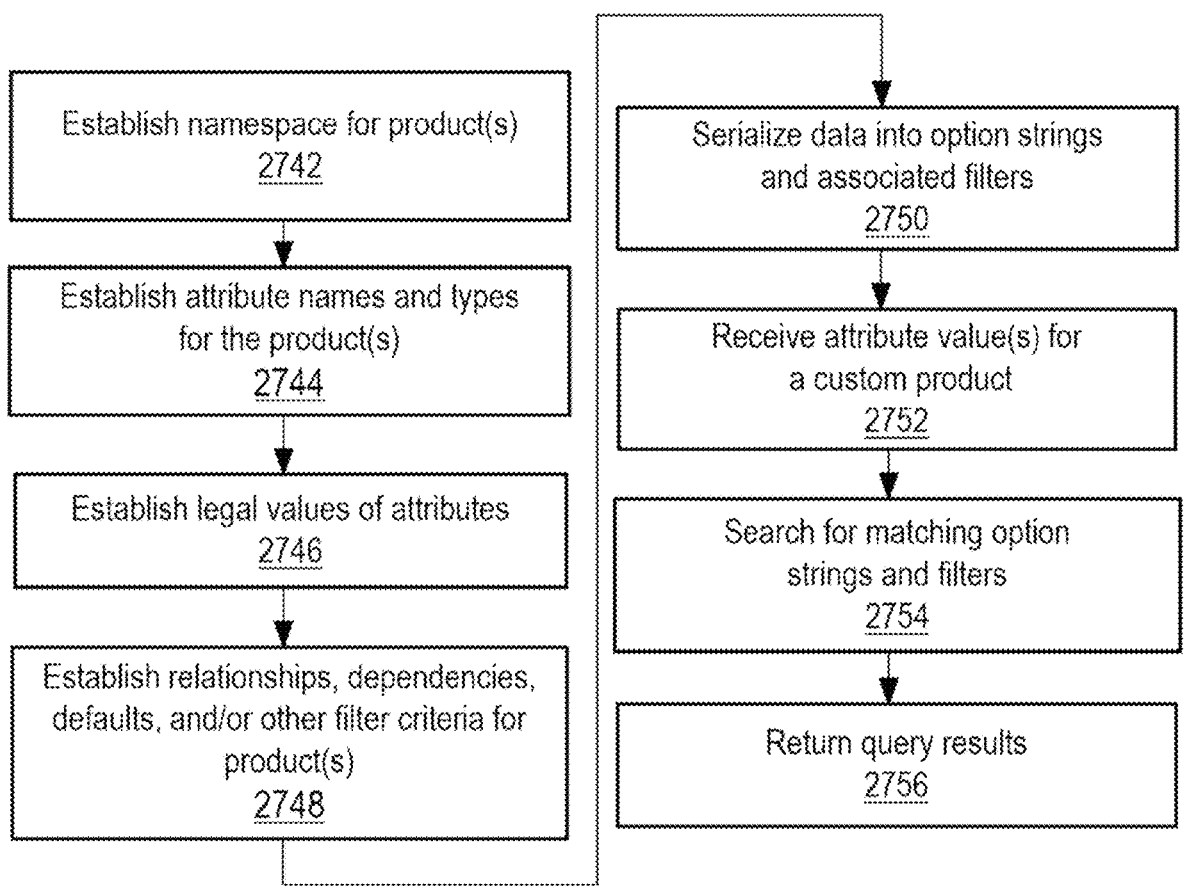
FIG. 27B is a flowchart illustrating an example process for implementing and using a product options framework, according to some embodiments.

FIG. 27B is a flowchart illustrating an example process for implementing and using a product options framework 110, according to some embodiments. In step 2742, a namespace is established for one or more products. In some embodiments, each product defined in product data definitions 334 is associated with a descriptive namespace. A namespace may represent a class of product, such as Shirt, Print, etc.

In step 2744, attribute names and types are established for the products. In some embodiments, each namespace has a plurality of attribute definitions for potential attributes of products. For the Print namespace, attributes may include, without limitation, a Size attribute defined as [Width, Height], and Media attribute. The attribute definitions comprise declarations of attribute names, legal attribute values, and attribute data types such as string, decimal, integer, array, Boolean.

In step 2746, the legal values for the attributes established at step 2744 are established for the corresponding products. Attribute values may be specified as a discrete set or a continuous range as described above. Attribute values may also be computed or referential; for example, a Size could be Large, computed based on an Aspect Ratio of a selected digital image asset to be a rectangle that fits within range dimensions of 32×48 inches. The framework may implement an evaluation language to permit determining the computed values at the time that expressions are evaluated.

A benefit of this approach is that declarations of legal values may be used rather than using a complex table join as in a typical RDBMS approach.

In some embodiments, each product also comprises definitions of key values; any attribute may be specified as a key value, and key values may be used in evaluation of expressions. The key values may comprise any combination of attributes that uniquely identify a product.

When a product has been defined in terms of a namespace, attributes, values, and key values, then one or more product options may be declared or defined with reference to the key values. Example product options comprise example expressions identified above.

In step 2748, relationships, dependencies, defaults, and other filter criteria may be established for the one or more products. For example, this step may comprise defining accessory filters, default filters, render mappings, and other filters as described below. These filters may be used to identify constraints and prune result sets as a user is designing a custom product.

In step 2750, the data is serialized into option strings and filter expressions. In some embodiments, serializing the data involves generating key-value expressions such as described above for the various product options and associated filters. The serialized data may be stored in key-value store 336 and matched against incoming queries using the matching techniques described above.

In some embodiments, special-purpose data definitions for a key-value store 336 are provided and may be stored using a commercially available or open-source key-value store such as MemCache or other intermediate caches. In some embodiments, other infrastructure software elements make use of the special-purpose key-value store to use expressive relationships between products. Examples of other infrastructure elements include accessories, dependencies, defaults, and rendering.

In step 2752, one or more attribute values are received that define a custom product. For example, if the user is customizing a Print, the user may specify the width and the height of the print. The attribute values selected or otherwise specified by the user may affect the availability and defaults of other attribute values for the custom product or accessory products. Furthermore, the attribute values selected by the user may affect what accessory products are recommended and how a representative image of the custom product is rendered.

In step 2754, the received attribute values are used to search for matching option strings and filters. For example, the attributes and corresponding attribute value(s) may be serialized into one or more key-value expressions, which may be used to query the product accessories framework. Matching operations such as described above may then be implemented to determine matching product options and filters. The matching product options and filters may then be used to provide a query result set.

In step 2756, the results of the search are returned. The result set may identify or otherwise include, without limitation, constraints on the available attribute values and accessories that may be selected by the user, the default attribute values that should be displayed to a user, a set of compatible accessory products that should be recommended to the user, and a rendered image of the product.

8.3 Accessories Framework

In some embodiments, the product options framework comprises or can access an accessories framework comprising one or more computer programs, key-value store definitions, stored procedures, or other software elements that implement functions for determining whether one product can be an accessory to another product.

Further, the accessories framework is configured to determine product characteristics of multiple products and to enforce compatibility. For example, in the context of framed products, a Frame could be defined having the following attributes: size=[w, h]; moldings; mount type; float widths[l, t, r, b]; mat1; mat2; mat widths[l, t, r, b]; glazing. The example attributes reflect the following logic. The size of a frame for a framed product may be compatible only with selected materials; frames may comprise molding types and legal frame opening sizes. The size of the customer requested frame may be incompatible with a particular molding type. Different mounting options may be provided such as float mounting that may be incompatible with particular print sizes or molding types or opening sizes. A float mounting may have specified widths of the float spacing for left, top, right and bottom parts of the product. There may be one or two mats having different types and different left, top, right, and bottom widths. There may be plastic or glass glazing, or glazing may be absent.

Choices of different values for certain attributes may affect allowed values of other attributes and therefore the compatibility of the specified product with other products. For example, for a Print if Mat1 is present and has valid values, then the Float Widths are invalid or must be zero. If the Mount Type is float then the Float Widths must have integer values and the Mat Widths values must be zero. If the Mount Type is Mat and the Mat Widths are 3", then the total product size becomes larger and the molding size may or may not be compatible with the resulting size and other values may become legal or illegal.

A Print may comprise size[w, h] and media. If the end user or customer is considering Print products, the computer system should obtain and display information about only other products (accessories) that are legal or allowed for manufacture with a particular Print. Therefore, there is a need to know whether a standard frame matches a selected print or whether a custom frame is possible. As an example, if the Size of the Print is [30,48] then a standard (fixed) size frame of [4,6] is not compatible and should be filtered out; however, a [32,48] frame will work and a frame of [30,46] might be compatible if cropping is used.

In some embodiments, the accessories framework comprises logic configured to implement a plurality of filters, comparison logic, and enforcement logic. In some embodiments, a first product is defined by an option string comprising key attributes and values in the form described for expressions [1] to [9] above as examples. The first product is also associated with a first filter definition, which may comprise a stored procedure in a SQL Server database or an equivalent procedure processing system. The comparison logic is configured to receive the first option string and apply the first filter definition to result in generating a result set of matching second products. For example, if the first option string specifies ProductType=Print, then the second product result set would exclude all products with a ProductType=Necktie.

The matching second products represent candidate accessories or compatible products subject to a second level of filtering. Each of the second products is defined by a different option string and has an associated second filter. The enforcement logic is also configured to apply each second filter to the first option string to determine whether the first product is compatible with that particular second product and to return a result of Valid or Invalid. If not, then that particular second product may be removed from the result set. For example, one of the second products may comprise a standard (fixed) size frame having a Size of [4,6] and its filter definition would exclude the first product if the Size of the Print is [30,48].

The enforcement logic then may generate or retrieve a further filter for enforcement purposes. Assume, for example, that the enforcement filter specifies only custom frame products having Size [32,48] with a Mount Type of Mat. The enforcement filter becomes bound to the first product and used in regulating the optional products that are displayed in a user interface to a user. Therefore, for example, as the user is browsing options for the particular print, the user will be able to select only frames that have a Size of [32,48] and can only select a Mount Type of Mat. Other attribute values may be enforced, such as to allow only non-glare glazing, etc.

In some embodiments, a Filter may be defined as a stored procedure in a database system. In some embodiments, a Filter comprises an association of a Filter Set ID; a Product ID; a Product Type; a Context; a Filter; a Filter Expression; and Filter Variables. The Filter Set ID is a unique value for identification purposes. The Product ID value is optional and may associate the filter with a particular product to indicate relevance to that product. The Product Type value is optional and may associate the filter with a particular product type to indicate relevance to that product type. The Context value is optional and may comprise a declarative string of the type described above with respect to context identification.

The Filter may comprise either a declarative string in the key-value formats described above, or one or more programmatic statements that implement filter logic in accordance with a programmatic evaluation language framework provided by the underlying database. For example, if an intentional or expressive definition of the filter cannot be known in advance then programmatic statements enable computing a declarative string for the filter on-the-fly. For example, size values can be computed and then captured in a declarative string that fully expresses the filter. A Filter Expression may comprise a static declarative string of the type described above or may be computed. The Filter Variables are optional and may identify computational values that are used with the programmatic statements.

Each filter also comprises or is related to a Mapping Table. The Mapping Table comprises a list of one or more options strings that identify products to recommend or output when the filter is matched. Thus, the output of a Filter may be a set of one or more recommended products that are compatible with or accessories for the first product that passes the filter. A Mapping Table may have any number of entries. The accessories framework is configured to obtain, when a first product passes a Filter, the contents of the Mapping Table for use in performing a second-level filtering of the first product against all second products that are identified in the Mapping Table. Each Mapping Table entry may identify required attributes for enforcement in the second level filtering step; thus, each Mapping Table has constraints that must be satisfied for the associated second product to be compatible with the first product.

A benefit of this approach is that developing complex or computed filters does not require changes in database schema but merely involves preparing a small snippet of program code that is placed in the filter declaration.

Figure 28:
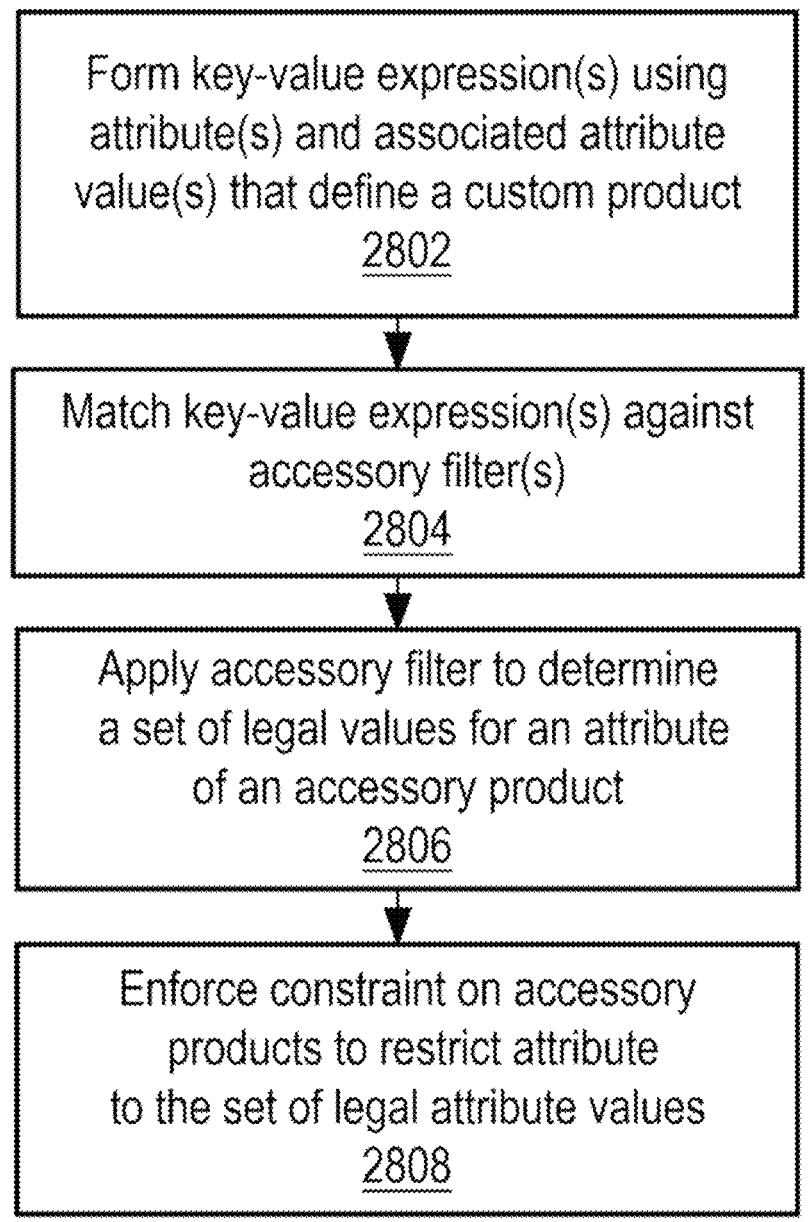
FIG. 28 is a flowchart illustrating an example process using an accessories framework, according to some embodiments.

FIG. 28 is a flowchart illustrating an example process for implementing and using accessories framework 112, according to some embodiments. In step 2802, one or more key-value expressions such as those described for expressions [1] to [9] above are formed using attributes and attribute values that define a custom product. For example, the user may select or otherwise specify the dimensions of a particular custom print product. These dimensions may be serialized into an attribute string comprising one or more key-value pairs. The key-value pairs may include a first key-value pair comprising a width key and corresponding value identifying the width of the print and a second key-value pair comprising a height key and a corresponding value identifying the height of the print.

In step 2804, the key-value expressions are matched against accessory filters associated with the custom product. For instance, width and height attribute key-value pairs may be matched with a filter that identifies compatible frame sizes for accessory frame products based on the associated width and height values. The filter may comprise one or more of Filter Set ID; a Product ID; a Product Type; a Context; a Filter; a Filter Expression; and Filter Variables as described above.

In step 2806, the accessory filter is applied to determine a set of legal values for an attribute of an accessory product. For example, if the custom print has Size [32,48], then the enforcement logic may limit the size of accessory frames to [32, 48]. Alternatively, the enforcement logic may permit a range of sizes, such as [30-32, 46-48] to permit cropping or other customizations.

In step 2808, a constraint is enforced on the accessory products to restrict the attribute to the set of legal attribute values. This step may comprise the enforcement logic limiting or otherwise preventing a user from selecting an illegal attribute value for the accessory product. The enforcement logic may also prevent accessory recommendations of accessories that have attribute values that are outside of the legal set of values. This step may also comprise performing secondary filtering as described above to determine the compatibility of the custom product as described by filters associated with the matched accessory products. Thus, even if the accessory products satisfy the first-level filtering, the enforcement logic may exclude the accessory product if the second-level filtering identifies that the custom product is incompatible.

8.4 Bundling Framework for Grouped Products

In some embodiments, the product options framework includes or can access a bundling framework providing logic to support processing attributes that are dependent on values of other attributes. The framework allows accounting for the fact that certain accessories may not fit a particular first product, and for determining compatibility both in terms of product manufacturing and whether digital images of products are capable of visualizing or rendering in a display unit.

Figure 31:
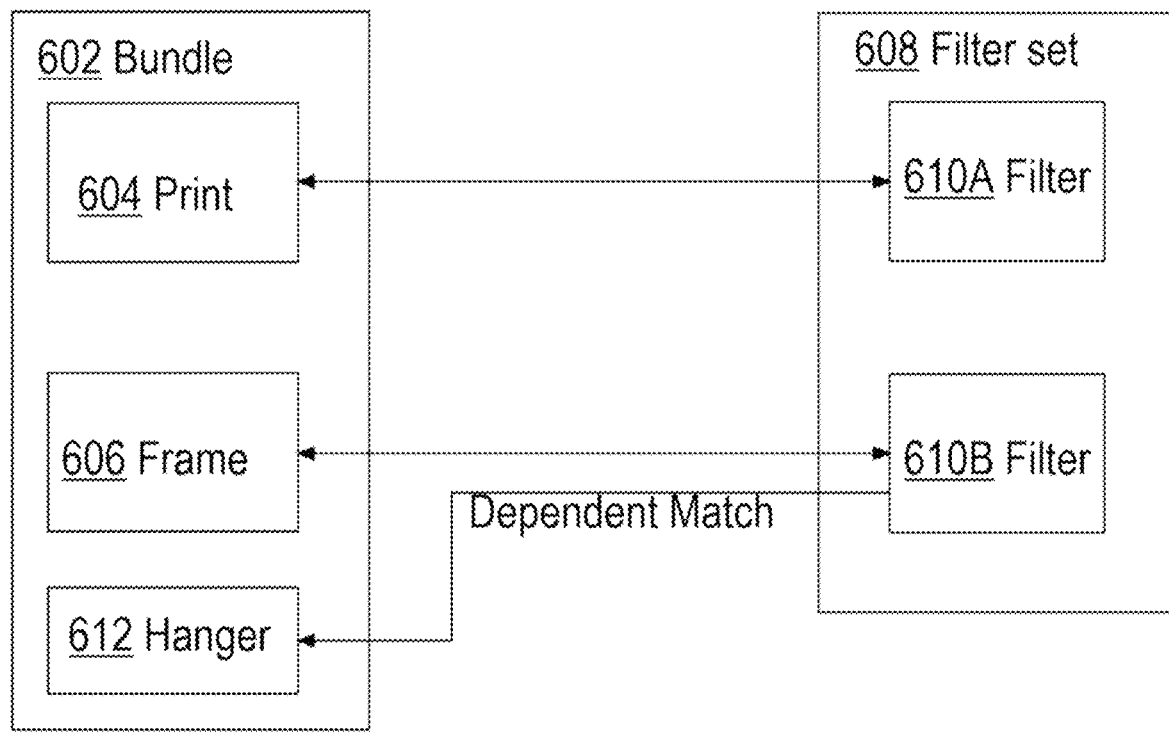
FIG. 31 illustrates relationships of products and filters.

FIG. 31 illustrates an example of relationships between a product bundle, a filter set, and an accessory product. In some embodiments, a product bundle is defined as an association of two or more products that can be visualized together in a graphical user interface and are compatible or can be ordered together for use together or in a combined custom manufactured product. Logic implementing the bundle framework can resolve dependencies between products.

In some embodiments, a product bundle 602 comprises two or more products, for example, a Print 604 and a Frame 606. A bundle may reflect dependencies; for example, if Frame 606 is deleted from the bundle then the Print 604 may remain and could be visualized and ordered independently.

Dependencies are not necessary and multiple products could be added to the bundle with no dependencies. In contrast, if the Print 604 is deleted then the Frame 606 also should be deleted because frames are not ordered separate from framed products.

Each product is associated with a particular filter 610A, 610B in a Filter Set 608. Each filter 610A, 610B matches a corresponding constituent product in the product bundle 602 and is associated with the product bundle via the Filter Set 608. The Filter Set 608 is valid only if each and every individual filter 601A, 610B matches the products in the product bundle 602. Thus, a Filter Set 608 can enforce joined constraints that apply to a product bundle as a whole. In an implementation, a Filter Set may be bound in its Mapping Table to one or more particular accessory products; the effect is to recommend the specified accessory products when all filters in the Filter Set are determined to match corresponding products of a Product Bundle.

An accessory product such as a hanger 612 for a framed print may be associated with one of the filters 610B as a dependent match on that filter. In some embodiments, a Filter Set 608 includes a declaration of a single dependency that references a particular dependent product or an options string that matches a plurality of dependent products. Consequently, if a particular dependent product such as hanger 612 is added to the product bundle 602, the dependency defined in Filter Set 608 for that product bundle may be used to determine when to permit or remove the dependent product for purposes of offering, ordering for custom manufacture, or rendering in a user interface display. A dependent match reflects the concept that a particular accessory product may be appropriate to associate with a bundle only when both the constituent products of the bundle are in the bundle or only with a particular product in the bundle. For example, if the bundle 602 comprises both a Print 604 and Frame 606, then it is appropriate to offer the customer a hanger 612 for the combined framed product, and that hanger may be compatible only with the particular kind of Frame 606 and therefore the hanger is dependent on the Frame. However, if Frame 606 is removed from the bundle, then the hanger 612 should not be offered.

In some embodiments, the bundling framework comprises logic to support accurate rendering of bundled products by determining which views of combined products are valid or should be shown in a graphical user interface or other display. In general, when products are added to a bundle, the bundling logic is configured to examine each product, filter each product based on filters as previously described, and select and order one or more allowed views based on matches of the filters. For example, when the Product Type is Shirt, then only views or rendering logic appropriate for Shirts should be used. When other Product Types are involved, then other views may provide a better rendering or showcasing of that particular product type.

Figure 32:
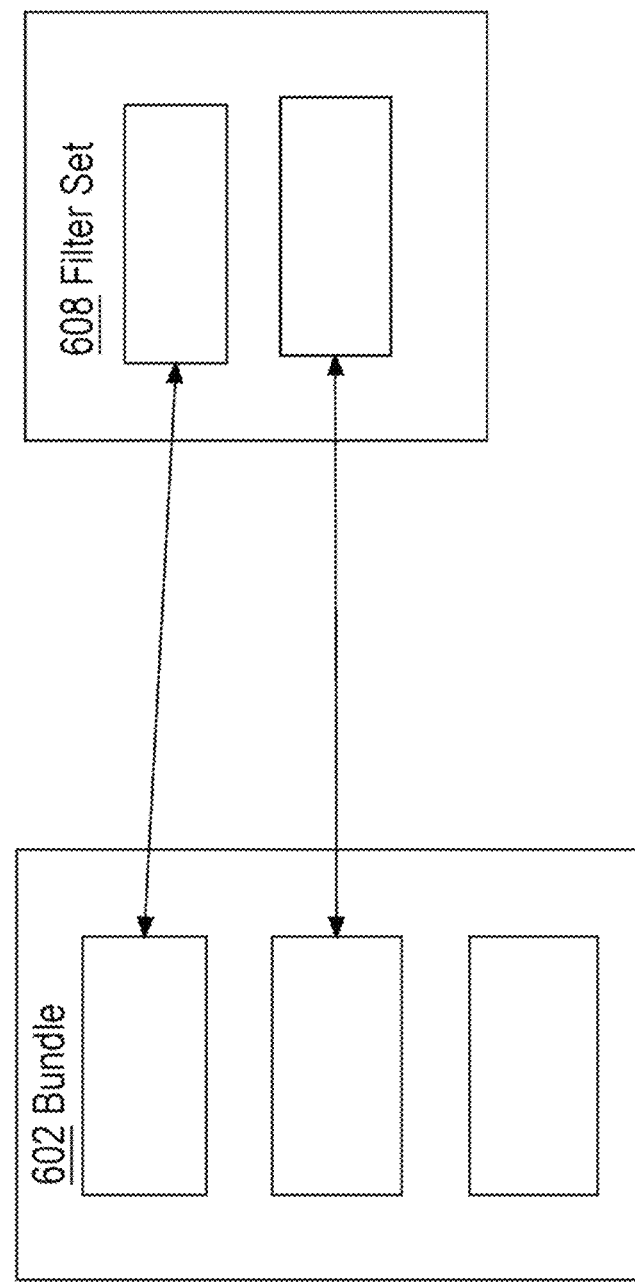
FIG. 32 illustrates unequal relationships of products and filters.

The rendering logic is not required to enforce complete matching of products in a bundle to corresponding filters. FIG. 32 illustrates a product bundle having three constituent products associated with a filter set having two filters that define allowed rendering views for the products. It may be seen that only two of the products in the bundle have matching rendering filters. The absence of a match for the third product is acceptable and merely means that one product in the bundle is not rendered, which may be appropriate depending on the nature of the product. Instead, if the filters are a complete subset of the corresponding products, but not an exactly matching subset, rendering can proceed. The number of matching filters, however, indicates that views are increasingly relevant. Filters may express an order; for example, it may be appropriate to first render an image of a print, then a mat, then a frame over the mat and print.

The rendering logic may be configured to accommodate product options and bundles. In some embodiments, the rendering logic supports defining rendering files and adding elements to the rendering logic using declarative statements rather than pure programming. Attributes of views may be declared in rendering files that serve as configuration files to drive rendering processes. In some embodiments, the capabilities of the rendering logic are matched to bundles of products through other declaratory statements and the matching syntax that have been described above. In this arrangement, declarations in the rendering configuration files may be transformed into rendering parameters after parsing according to the matching syntax described above. For example, declarations that are consumable by the attributes-engine may yield an output configuration file specifying allowed views of the corner of a framed print and rendering parameters for generating a correct visual rendering of the corners.

Declarations for particular products and the rendering logic may cooperate to produce compatible views for different products depending on whether a product has a matted or floated mount. Based on frame size, scaling may be applied to the rendered image. For example, if the print in a customer selection is relatively small, then scaling is applied to zoom in on the order of the print and preclude displaying areas outside the bounds of the print. Conversely, large prints should be given zoom-out scaling for correct rendering and instructions for scaling and other effects may be declared as part of rendering filters. Filter declarations for rendering also may contain references to textures for use in rendering operations for frame elements, mats, and other product features.

8.5 Default Framework

In some embodiments, it may be useful to offer end user consumers a set of default attributes for each particular Product Type. Because the present approaches may be used to offer a large number of product types each having many attributes with a large number of resulting permutations, the sheer number of available choices could potentially overwhelm a user. Therefore, In some embodiments, a defaulting framework comprises logic for declaring and enforcing various default attribute values to assist users in making product selections. The defaulting framework also provides flexible and declarative mechanisms for introducing new products into the system with specification of appropriate default values.

A defaulting framework is also beneficial in assigning an appropriate default value to various product attributes. For example, when Product Type is T-shirt, an appropriate default value for a Size attribute may be Large; when the Product Type is Infant Creeper, the appropriate default value for Size may be "6 Months". Thus, it will be clear that not all values for Size are relevant to all product types. Accordingly, an analyst or other product manager can declare a default value for each attribute value to enable the system to rapidly display example value options to the end user consumer. For example, the user may have selected Shirts, but may not have selected a Color value; the defaulting engine can review declarations to identify the one that is most relevant to the current set of end user selections and apply that default value to the rendering display and to other frameworks and filters.

In some embodiments, as a user selects or changes a particular attribute value, the default values for other attributes of the same product may also change. For example, one declaration might provide that if the Product is a giclee print and the Mount Type is Float, then a related default is: {Molding !=Metal} (is not metal). Alternatively, if the Product is a Print, the Print Size is [20,16] and the Mount Type is Mat, then the Mat Size values might default to 3" in order to present a good default appearance. For a small print, the default mat size might be much smaller.

An example defaulting declaration is: Size.Default=Large. Alternatively, a default declaration is: When Style=InfantTShirt then Size.Default=6 Months. Successive levels of defaults may be provided; for example, an alternative declaration may state: If Style=InfantTShirt & Color=Lime Size.Default=12 Months. Thus, successive default declarations may establish, with progressively greater granularity, narrower sets of rules for defaulting that override prior broader rules.

In some embodiments, each defaulting declaration is expressed in the same form described above for a Filter. Filter Expression variables are evaluated based on Filter Variable declarations and the current Context to yield a Filter; the resulting Filter matches on certain products and maps to the default attribute values, which may be declared in the Map Table of the Filter.

Figure 29:
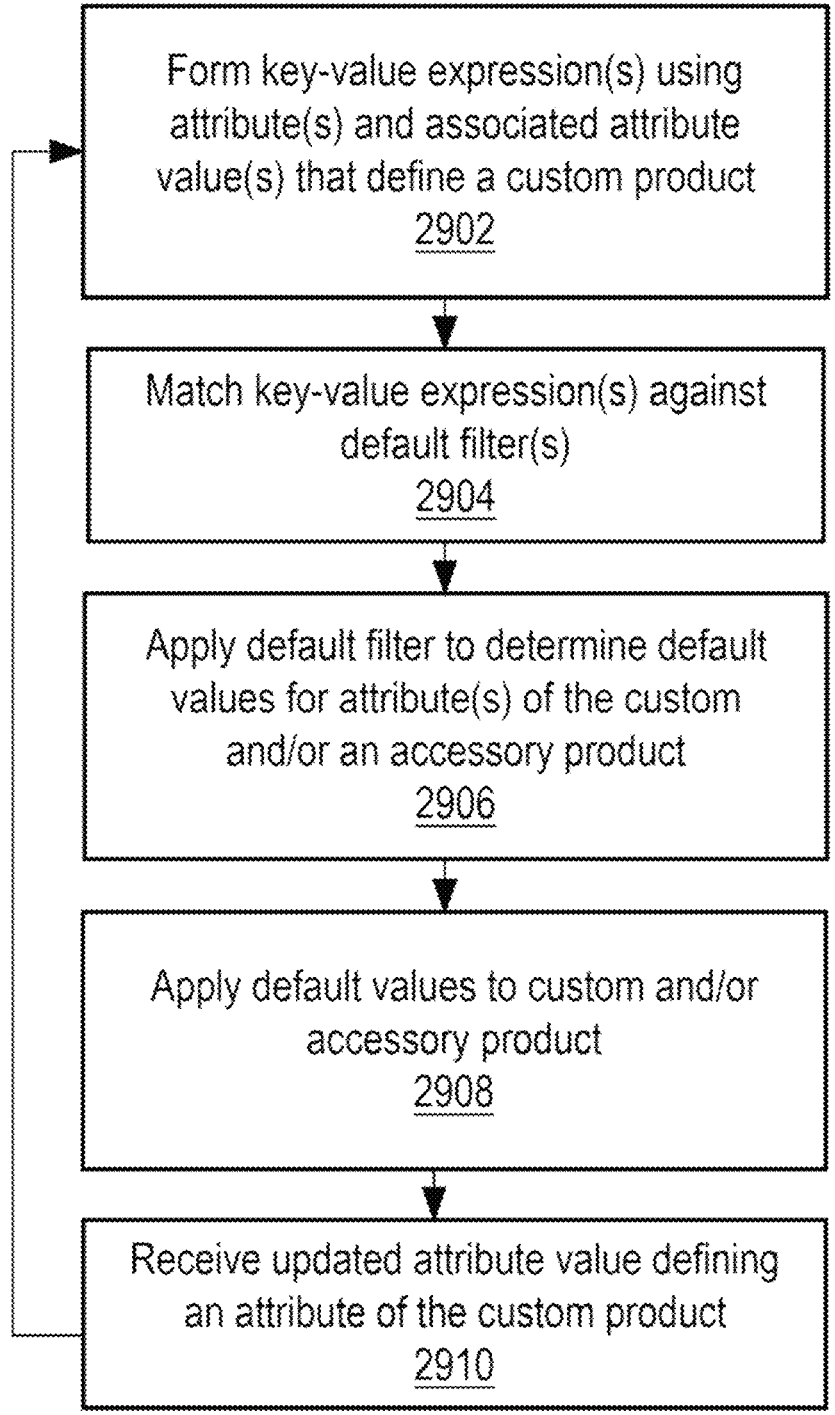
FIG. 29 is a flowchart illustrating an example process for using a defaulting framework, according to some embodiments.

FIG. 29 is a flowchart illustrating an example process for implementing and using defaulting framework 116, according to some embodiments. In step 2902, one or more key-value expressions such as those described for expressions [1] to [9] above are formed using attributes and attribute values that define or are otherwise associated with a custom product. These may be the same attributes and values of the custom product used at step 302 for the accessory filtering or different attributes and values, depending on the implementation.

In step 2904, the key-value expressions are matched against default filters. For instance, if the user is designing a T-shirt and has selected a black color, then the attribute "Color" and associated value "Black" may be matched with one or more relevant default filters. Relevant default filters in this context may be any filter where the Color attribute is used in determining and selecting default values In step 2906, the default filter is applied to determine default values for attributes of the custom product and/or accessory products. For example, if the user has selected a color of black, then a default filter may determine that a large should be the default size of the T-shirt. If baseball caps are recommended, then the default Color recommended may be Green.

In step 2908, the default value is applied to the custom and/or accessory product. This step may comprise selecting the default value and causing the selected value to be displayed to the end user. For example, if the user is designing a custom T-shirt and selects a Color of Black, then the system may automatically select Large as the default Size. These attribute values may be used to render a representative image of a large, black T-shirt.

While designing the custom product, the user may update one or more attribute values that affect the default values of other attributes. Accordingly, if an updated attribute value is received at step 410, then the process may return to step 402 to update the default values. For example, if the user changes the Color attribute from Black to Purple, then the default Size attribute may be changed from Large to Medium.

8.6 Rendering Framework

Rendering framework 730 may comprise one or more computer programs, other software elements such as stored procedures, or other computer logic configured to perform the following functions. Further, the rendering framework 730 may be coupled to logic that is specially configured to perform rendering 3D models into 2D graphical images that can be delivered to a user station such as a browser. In some embodiments, the rendering logic is termed a Real View rendering engine.

In some embodiments, the user is shown a synthetically constructed image of the product that the user is configuring for manufacturing. In creating this rendering, not all product options are enumerated as prebuilt images. Some options, such as final product size may not affect the image generation. Other options, such as frame color or printing surface may be synthetically applied to the image. Choosing appropriate key-value subsets and mapping those to the Real View rendering engine is another extension of the options framework.

In some embodiments, the user is shown an array of images to suggest alternative products, accessories and bundles that may be manufactured. Choosing a small set of possible products from all available configurations that satisfy the multiple constraints of being able to manufacture the product, being able to synthetically preview the product and any additional contextual constraints imposed by the user or seller is handled by the options framework. The ability to not only constrain the solution set but to mark constrained solutions as being more or less relevant is key to providing a successful user experience.

In some embodiments, the option framework is used to map select product attributes to render engine instructions. The mapping may implement the matching logic described above. For example, the key-value pairs for the select product attributes may map to specific render files. The RealView rendering engine may access these render files to generate an image that In some embodiments, the option framework is used to normalize and minimize the query strings associated with a generated RealView image to maximize the effective use and performance of external image caches.

Figure 30:
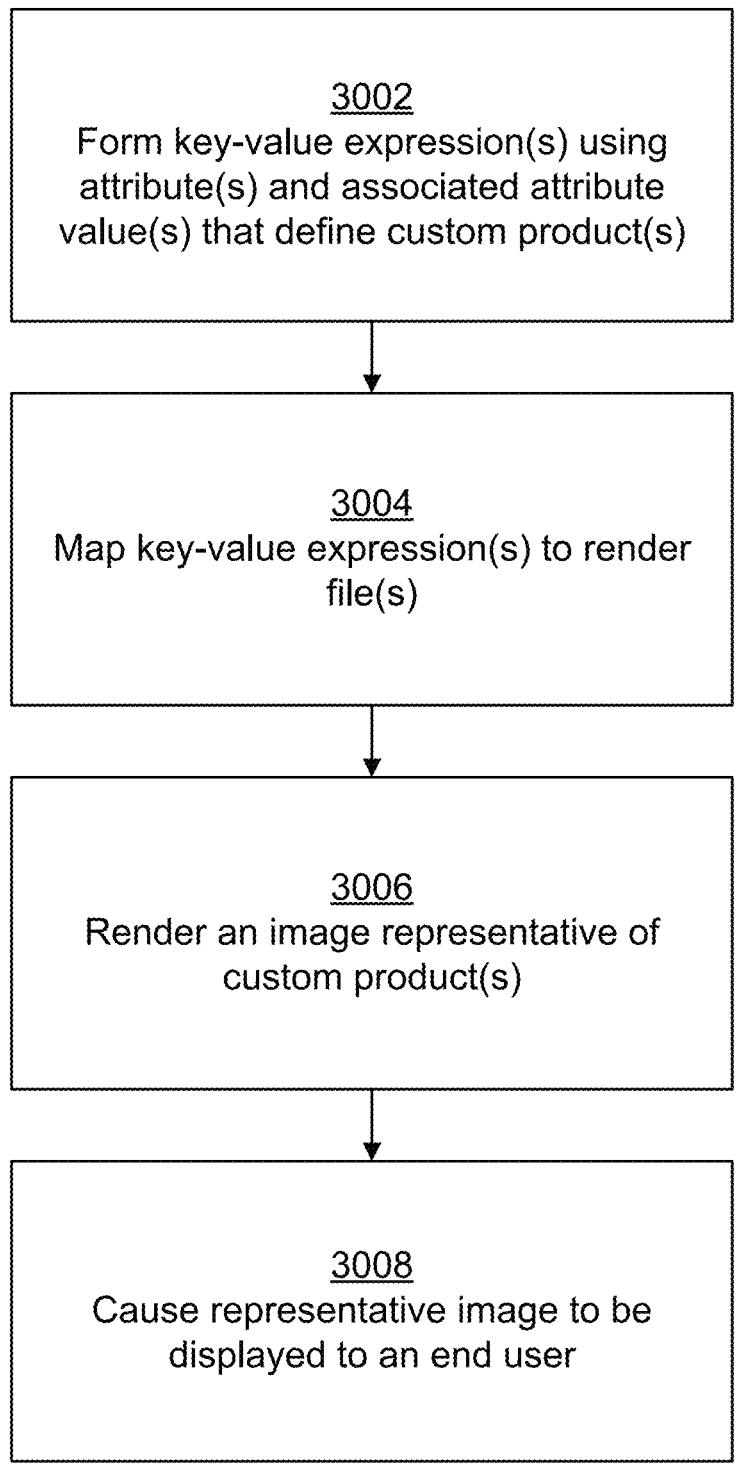
FIG. 30 is a flowchart illustrating an example process for using a rendering framework, according to some embodiments.

FIG. 30 is a flowchart illustrating an example process for implementing and using rendering framework 130, according to some embodiments. In step 3002, one or more key-value expressions such as those described for expressions [1] to [9] above are formed using attributes and attribute values that define one or more custom product(s). In some embodiments, this step may include forming key-value expressions for each product in a product bundle.

In step 3004, the key-value expressions are mapped to render files. For instance, if the user has designed a custom Print with dimensions of 32×48 inches and bundled the Print with a black wood frame, then the following key-value expression may be formed: Size=[32×48] & Molding=Wood & Color=Black. This expression may map to one or more render files which may be processed by the rendering engine to render an image reflecting the print in the custom frame.

In step 3006, the rendering engine renders an image representative of the custom product. Any suitable rendering process may be implemented at these steps that uses the render files identified at step 3004 to generate an appropriate image representation of a custom product or product bundle.

For example, this step may include rendering 3D models into 2D graphical images that can be delivered to a user station such as a browser.

In step 3008, the representative image is displayed to the end user that is designing the product. This step may comprise, for example, causing the representative image to be displayed through a web browser or other application program that the user is using to design the custom product.

8.7 Additional Frameworks

In addition to the frameworks described above, attributes engine 338 facilitates the addition and implementation of other frameworks without requiring complex database schemas or complex programming. In one embodiment, a pricing framework may be provided. The pricing framework may map key-value expressions to corresponding price values. For example, if a new product includes a new attribute value for a particular attribute that is relevant in calculating the price, then a new key name may be generated and written into the pricing tables. The key-value matching may then apply a pricing filter such that when the particular attribute has the new attribute value, the price is changed to the identified price.

In another embodiment, a description framework may be provided to enable other elements of the system to retrieve or obtain product descriptions.

9.0 Implementation Mechanism—Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 33:
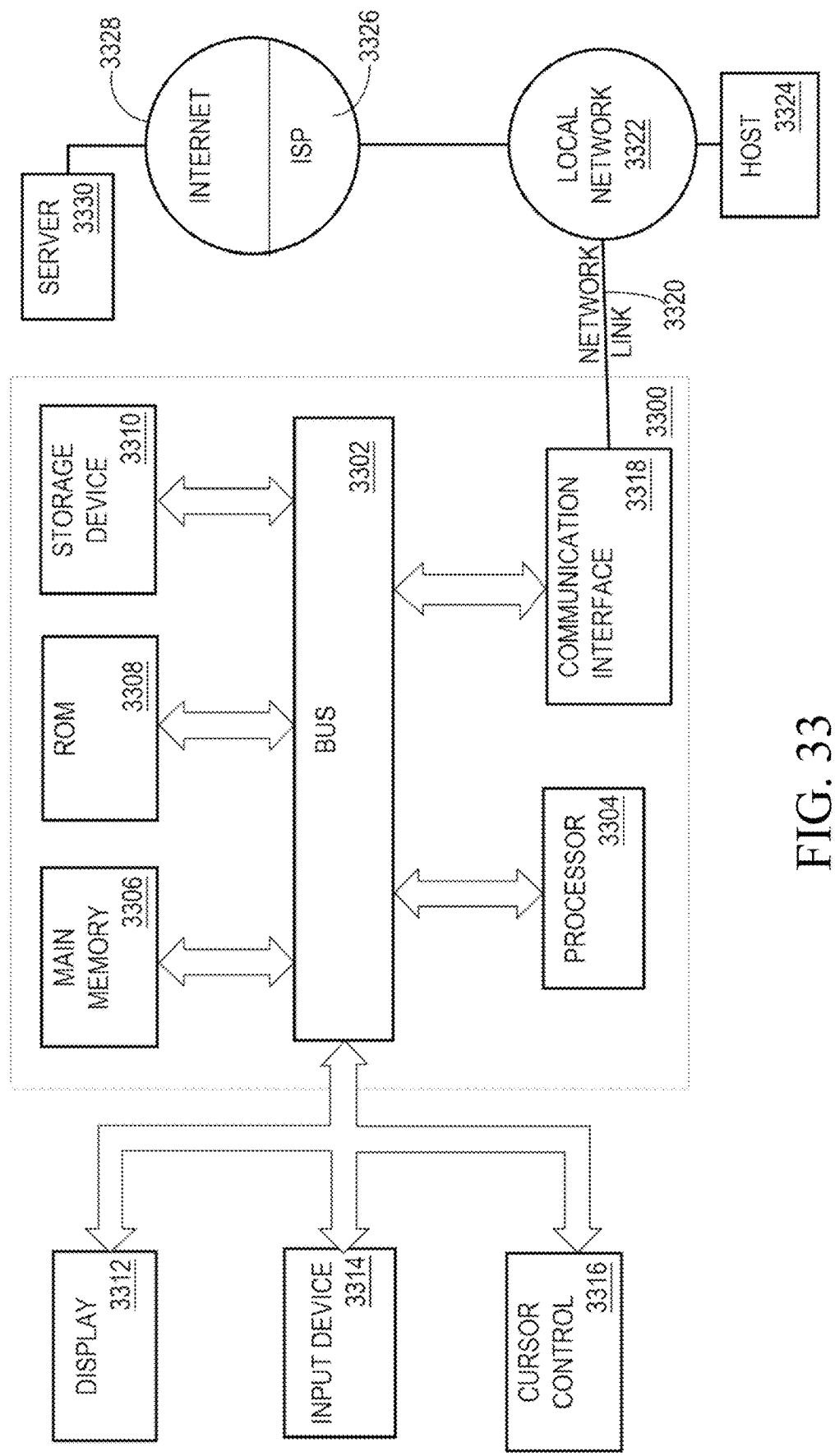
FIG. 33 is a block diagram that illustrates a computer system with which the techniques herein may be implemented.

For example, FIG. 33 is a block diagram that illustrates a computer system 3300. Computer system 3300 includes a bus 3302 or other communication mechanism for communicating information, and a hardware processor 3304 coupled with bus 3302 for processing information. Hardware processor 3304 may be, for example, a general purpose microprocessor.

Computer system 3300 also includes a main memory 3306, such as a random access memory (RAM) or other dynamic storage device, coupled to bus 3302 for storing information and instructions to be executed by processor 3304. Main memory 3306 also may be used for storing temporary variables or other intermediate information during execution of instructions to be executed by processor 3304. Such instructions, when stored in non-transitory storage media accessible to processor 3304, render computer system 3300 into a special-purpose machine that is customized to perform the operations specified in the instructions.

Computer system 3300 further includes a read only memory (ROM) 3308 or other static storage device coupled to bus 3302 for storing static information and instructions for processor 3304. A storage device 3310, such as a magnetic disk or optical disk, is provided and coupled to bus 3302 for storing information and instructions.

Computer system 3300 may be coupled via bus 3302 to a display 3312, such as a cathode ray tube (CRT), for displaying information to a computer user. An input device 3314, including alphanumeric and other keys, is coupled to bus 3302 for communicating information and command selections to processor 3304. Another type of user input device is cursor control 3316, such as a mouse, a trackball, or cursor direction keys for communicating direction information and command selections to processor 3304 and for controlling cursor movement on display 3312. The input device typically has two degrees of freedom in two axes, a first axis (e.g., x) and a second axis (e.g., y), that allows the device to specify positions in a plane.

Computer system 3300 may implement the techniques described herein using customized hard-wired logic, one or more ASICs or FPGAs, firmware and/or program logic which in combination with the computer system causes or programs computer system 3300 to be a special-purpose machine. According to one embodiment, the techniques herein are performed by computer system 3300 in response to processor 3304 executing one or more sequences of one or more instructions contained in main memory 3306. Such instructions may be read into main memory 3306 from another storage medium, such as storage device 3310. Execution of the sequences of instructions contained in main memory 3306 causes processor 3304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 3310. Volatile media includes dynamic memory, such as main memory 3306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 3302. Transmission media can also take the form of acoustic or light waves, such as those generated during radio-wave and infra-red data communications.

Various forms of media may be involved in carrying one or more sequences of one or more instructions to processor 3304 for execution. For example, the instructions may initially be carried on a magnetic disk or solid state drive of a remote computer. The remote computer can load the instructions into its dynamic memory and send the instructions over a telephone line using a modem. A modem local to computer system 3300 can receive the data on the telephone line and use an infra-red transmitter to convert the data to an infra-red signal. An infra-red detector can receive the data carried in the infra-red signal and appropriate circuitry can place the data on bus 3302. Bus 3302 carries the data to main memory 3306, from which processor 3304 retrieves and executes the instructions. The instructions received by main memory 3306 may optionally be stored on storage device 3310 either before or after execution by processor 3304.

Computer system 3300 also includes a communication interface 3318 coupled to bus 3302. Communication interface 3318 provides a two-way data communication coupling to a network link 3320 that is connected to a local network 3322. For example, communication interface 3318 may be an integrated services digital network (ISDN) card, cable modem, satellite modem, or a modem to provide a data communication connection to a corresponding type of telephone line. As another example, communication interface 3318 may be a local area network (LAN) card to provide a data communication connection to a compatible LAN. Wireless links may also be implemented. In any such implementation, communication interface 3318 sends and receives electrical, electromagnetic, or optical signals that carry digital data streams representing various types of information.

Network link 3320 typically provides data communication through one or more networks to other data devices. For example, network link 3320 may provide a connection through local network 3322 to a host computer 3324 or to data equipment operated by an Internet Service Provider (ISP) 3326. ISP 3326 in turn provides data communication services through the worldwide packet data communication network now commonly referred to as the "Internet" 3328. Local network 3322 and Internet 3328 both use electrical, electromagnetic, or optical signals that carry digital data streams. The signals through the various networks and the signals on network link 3320 and through communication interface 3318, which carry the digital data to and from computer system 3300, are example forms of transmission media.

Computer system 3300 can send messages and receive data, including program code, through the network(s), network link 3320 and communication interface 3318. In the Internet example, a server 3330 might transmit a requested code for an application program through Internet 3328, ISP 3326, local network 3322 and communication interface 3318.

The received code may be executed by processor 3304 as it is received, and/or stored in storage device 3310, or other non-volatile storage for later execution.

10.0 Extensions and Alternatives

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A data processing method for automatically configuring custom product options based on user actions, the method comprising:
    generating, using an attribute engine of a plurality of frameworks, a user interface configured to allow selecting a product from a plurality of products that are customizable and displaying the user interface on a display device of a user computer;
    receiving, using a user interface framework of the plurality of frameworks, and via the user interface, a selection of a particular product, from the plurality of products, that require customization;
    wherein the particular product is associated with a product description comprising a plurality of key-value expressions of a specified syntax including declarative expressions used to retrieve attribute information about the product;
    wherein the attribute information about the product comprises attribute values specified as a discrete set or a continuous range computed using an evaluation language to permit determining them at the time that expressions are evaluated;
    wherein each selection, of a plurality of selections, provided via the user interface is tracked by a product options selection tracker of the plurality of frameworks, and used by the product options selection tracker to create a path comprising a plurality of webpage identifiers of webpages that have been launched as corresponding selections have been made;
    wherein the corresponding selections are automatically recorded;
    in response to receiving the selection of the particular product, automatically generating, by a product options framework of the plurality of frameworks, a plurality of customization options available for customizing the particular product;
    receiving, by a trigger generator of the plurality of frameworks, one or more triggers of a plurality of triggers, generated based on one or more customization options selected from the plurality of customization options;
    based on, at least in part, the one or more triggers and one or more customization attributes associated with the one or more customization options, automatically generating, by the product options selection tracker, one or more corresponding customization attribute values for the particular product;
    based on, at least in part, the triggers and the one or more corresponding customization attribute values, determining, by an attribute engine of the plurality of frameworks, physical constraints and manufacturing instructions for the particular product;
    based on, at least in part, the physical constraints, retrieving, by the product options framework, shared content that is shared by the particular product and at least one other product of the plurality of products, and transforming, by the product options framework, the shared content to transformed shared content;
    wherein the transformed shared content is in a format that the plurality of frameworks of a computer system accepts to display the particular product and the at least one other product of the plurality of products;
    storing, by the product options framework, the transformed shared content in association with the particular product and the at least one other product of the plurality of products;

based on, at least in part, the transformed shared content, automatically generating, by the product options framework, one or more first digital representations of the particular product and one or more second digital representations of the at least one other product of the plurality of products;

automatically transmitting in real-time, by the product options framework, the one or more first digital representations of the particular product and the one or more second digital representations of the at least one other product of the plurality of products to a rendering framework of the plurality of frameworks of the computer system to cause the display device to display the one or more first digital representations and the one or more second digital representations on the display device of the user computer;

wherein the path comprising the plurality of webpage identifiers of webpages, that have been launched as the corresponding selections have been made, is used to generate a plurality of triggers.

2. The data processing method of claim 1, wherein the user interface is implemented as a graphical user interface; wherein the user interface is configured to provide multi-facet search capabilities; wherein the user interface is configured to provide templates for a plurality of product customization options.

3. The data processing method of claim 1, wherein a trigger, of the plurality of triggers, captures a specific choice made by a user as the user interacts with the user interface and captures a specific customization attribute of the particular product that the user is interested in; wherein the trigger, of the plurality of triggers, is modifiable and enhance-able.

4. The data processing method of claim 1, wherein a trigger, of the plurality of triggers, is generated based on information collected about the user;
wherein the information about the user comprises: a user's profile, a user's preferences, a user's purchase history, a user's search history, and a user's location.

5. The data processing method of claim 1, further comprising:
publishing, at a computer collaboration computer, the product, having the one or more corresponding customization attribute values, by performing:
generating, based at least on the one or more corresponding customization attribute values, a group of customized products comprising one or more particular custom products, each particular customized product associated with a product type of a plurality of product types, each product type of the plurality of product types associated with a manufacturing constraint of multiple manufacturing constraints, each particular customized product having shared content that is shared by all of the one or more particular custom products.

6. The data processing method of claim 5, further comprising:
for a particular customized product from the plurality of products:
obtaining a manufacturing method for manufacturing the customized particular product;
determining a product type of the customized particular product and a manufacturing constraint associated with the product type;
based on, at least in part, the manufacturing constraint, determining physical constraints and manufacturing instructions for manufacturing the customized particular product using the manufacturing method;
generating transformed shared content by transforming the shared content, which is shared by all of the one or more particular custom products, to satisfy the physical constraints for manufacturing the particular customized product; and
storing the transformed shared content in association with the group of customized products for manufacturing the customized particular product.

7. The data processing method of claim 6, wherein the one or more particular custom products belong to one or more functional product groups;
wherein the one or more functional product groups are generated by the computer collaboration computer by grouping custom products based on certain types of designs, looks or styles;
wherein a functional product group, of the one or more functional product groups, includes a plurality of custom product that have a certain type of design, look or style;
wherein a functional product group, of the one or more functional product groups, includes custom products designed by one or more designers.

8. The data processing method of claim 7, wherein a functional product group, of the one or more functional product groups, includes tags associated with design aesthetic styles, aesthetic genre, or aesthetic theme;
wherein a functional product group, of the one or more functional products groups, includes products that are associated with similar aesthetic style; and
wherein the certain type of design includes one or more of: a certain pattern, a certain color palette, a certain feel, a certain material, a certain texture, a certain finish, or a certain ornamental style.

9. One or more non-transitory computer-readable storage media storing one or more sequences of instructions which, when executed by one or more processors, cause the one or more processors to perform:
generating, using an attribute engine of a plurality of frameworks, a user interface configured to allow selecting a product from a plurality of products that are customizable and displaying the user interface on a display device of a user computer;
receiving, using a user interface framework of the plurality of frameworks, and via the user interface, a selection of a particular product, from the plurality of products, that require customization;
wherein the particular product is associated with a product description comprising a plurality of key-value expressions of a specified syntax including declarative expressions used to retrieve attribute information about the product;
wherein the attribute information about the product comprises attribute values specified as a discrete set or a continuous range computed using an evaluation language to permit determining them at the time that expressions are evaluated;
wherein each selection, of a plurality of selections, provided via the user interface is tracked by a product options selection tracker of the plurality of frameworks, and used by the product options selection tracker to create a path comprising a plurality of webpage identifiers of webpages that have been launched as corresponding selections have been made;
wherein the corresponding selections are automatically recorded;

in response to receiving the selection of the particular product, automatically generating, by a product options framework of the plurality of frameworks, a plurality of customization options available for customizing the particular product;

receiving, by a trigger generator of the plurality of frameworks, one or more triggers of a plurality of triggers, generated based on one or more customization options selected from the plurality of customization options;

based on, at least in part, the one or more triggers and one or more customization attributes associated with the one or more customization options, automatically generating, by the product options selection tracker, one or more corresponding customization attribute values for the particular product;

based on, at least in part, the triggers and the one or more corresponding customization attribute values, determining, by an attribute engine of the plurality of frameworks, physical constraints and manufacturing instructions for the particular product;

based on, at least in part, the physical constraints, retrieving, by the product options framework, shared content that is shared by the particular product and at least one other product of the plurality of products, and transforming, by the product options framework, the shared content to transformed shared content;

wherein the transformed shared content is in a format that the plurality of frameworks of a computer system accepts to display the particular product and the at least one other product of the plurality of products;

storing, by the product options framework, the transformed shared content in association with the particular product and the at least one other product of the plurality of products;

based on, at least in part, the transformed shared content, automatically generating, by the product options framework, one or more first digital representations of the particular product and one or more second digital representations of the at least one other product of the plurality of products;

automatically transmitting in real-time, by the product options framework, the one or more first digital representations of the particular product and the one or more second digital representations of the at least one other product of the plurality of products to a rendering framework of the plurality of frameworks of the computer system to cause the display device to display the one or more first digital representations and the one or more second digital representations on the display device of the user computer;

wherein the path comprising the plurality of webpage identifiers of webpages, that have been launched as the corresponding selections have been made, is used to generate a plurality of triggers.

10. The one or more non-transitory computer-readable storage media of claim 9, wherein the user interface is implemented as a graphical user interface; wherein the user interface is configured to provide multi-facet search capabilities; wherein the user interface is configured to provide templates for a plurality of product customization options.

11. The one or more non-transitory computer-readable storage media of claim 9, wherein a trigger, of the plurality of triggers, captures a specific choice made by a user as the user interacts with the user interface and captures a specific customization attribute of the particular product that the user is interested in; wherein the trigger, of the plurality of triggers, is modifiable and enhance-able.

12. The one or more non-transitory computer-readable storage media of claim 9, wherein a trigger, of the plurality of triggers, is generated based on information collected about the user; wherein the information about the user comprises: a user's profile, a user's preferences, a user's purchase history, a user's search history, and a user's location.

13. The one or more non-transitory computer-readable storage media of claim 9, further comprising:

publishing, at a computer collaboration computer, the particular product, having the one or more corresponding customization attribute values, by performing:

generating, based at least on the one or more corresponding customization attribute values, a group of customized products comprising one or more particular custom products, each particular customized product associated with a product type of a plurality of product types, each product type of the plurality of product types associated with a manufacturing constraint of multiple manufacturing constraints, each particular customized product having shared content that is shared by all of the one or more particular custom products.

14. The one or more non-transitory computer-readable storage media of claim 13, further comprising:

for a particular customized product from the plurality of products:

obtaining a manufacturing method for manufacturing the customized particular product;

determining a product type of the customized particular product and a manufacturing constraint associated with the product type;

based on, at least in part, the manufacturing constraint, determining physical constraints and manufacturing instructions for manufacturing the customized particular product using the manufacturing method;

generating transformed shared content by transforming the shared content, which is shared by all of the one or more particular custom products, to satisfy the physical constraints for manufacturing the particular customized product; and storing the transformed shared content in association with the group of customized products for manufacturing the customized particular product.

15. The one or more non-transitory computer-readable storage media of claim 14, wherein the one or more particular custom products belong to one or more functional product groups;

wherein the one or more functional product groups are generated by the computer collaboration computer by grouping custom products based on certain types of designs, looks or styles;

wherein a functional product group, of the one or more functional product groups, includes a plurality of custom product that have a certain type of design, look or style;

wherein a functional product group, of the one or more functional product groups, includes custom products designed by one or more designers.

16. The one or more non-transitory computer-readable storage media of claim 15, wherein a functional product group, of the one or more functional product groups, includes tags associated with design aesthetic styles, aesthetic genre, or aesthetic theme;

wherein a functional product group, of the one or more functional products groups, includes products that are associated with similar aesthetic style; and wherein the certain type of design includes one or more of: a certain pattern, a certain color palette, a certain feel, a certain material, a certain texture, a certain finish, or a certain ornamental style.

\* \* \* \* \*